(12) United States Patent
Kim et al.

(10) Patent No.: US 11,451,267 B2
(45) Date of Patent: Sep. 20, 2022

(54) TRANSRECEIVING METHOD AND APPARATUS APPLYING BEAM DIVERSITY IN WIRELESS COMMUNICATION SYSTEM

(71) Applicant: Samsung Electronics Co., Ltd., Suwon-si (KR)

(72) Inventors: Jungju Kim, Incheon (KR); Daehyun Kim, Hanam-si (KR); Taekyoung Kim, Hwaseong-si (KR); Eungkuk Nam, Yongin-si (KR); Joosung Park, Suwon-si (KR); Wonjun Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/630,182

(22) PCT Filed: May 21, 2018

(86) PCT No.: PCT/KR2018/005800
§ 371 (c)(1),
(2) Date: Jan. 10, 2020

(87) PCT Pub. No.: WO2019/013444
PCT Pub. Date: Jan. 17, 2019

(65) Prior Publication Data
US 2020/0136680 A1      Apr. 30, 2020

Related U.S. Application Data

(60) Provisional application No. 62/532,080, filed on Jul. 13, 2017.

(51) Int. Cl.
*H04B 7/06* (2006.01)
*H04B 7/0408* (2017.01)
(Continued)

(52) U.S. Cl.
CPC ......... *H04B 7/0408* (2013.01); *H04B 7/0469* (2013.01); *H04B 7/0617* (2013.01); *H04L 1/1812* (2013.01)

(58) Field of Classification Search
CPC .......... H04B 7/04; H04B 7/06; H04B 7/0408; H04B 7/0456; H04B 7/0469;
(Continued)

(56) References Cited

U.S. PATENT DOCUMENTS 6,005,516 A     12/1999   Reudink et al.
6,980,832 B1    12/2005   Ylitalo et al.
(Continued)

FOREIGN PATENT DOCUMENTS

CN      103875191 A      6/2014
KR      10-1063623 B1    9/2011
(Continued)

OTHER PUBLICATIONS

Huawei et al., 'Beam diversity for data and control channels', R1-1700040, 3GPP TSG RAN WG1 NR Ad Hoc Meeting, Jan. 19, 2017, Spokane, USA.
(Continued)

*Primary Examiner* — Shawkat M Ali
(74) *Attorney, Agent, or Firm* — Jefferson IP Law, LLP

(57) ABSTRACT

The present disclosure relates to a communication technique converging a 5G communication system with IoT technology to support a higher data transmission rate in a beyond-4G system. The present disclosure, based on 5G communication technology and IoT-related technology, can be applied to intelligent services (for example, smart homes, smart buildings, smart cities, smart cars or connected cars, health care, digital education, retail industry, and security
(Continued)

and safety-related services). Disclosed in the present invention are a transreceiving method and an apparatus to which beam diversity is applied.

16 Claims, 23 Drawing Sheets

(51) Int. Cl.
   *H04B 7/0456* (2017.01)
   *H04L 1/18* (2006.01)
(58) Field of Classification Search
   CPC ....... H04B 7/0617; H04L 1/18; H04L 1/1812;
            H04L 1/1861; H04L 5/00; H04L 27/26;
            H04W 16/28; H04W 48/16; H04W 24/08;
            H04W 72/04; H04W 72/08; H04W 72/14;
            H04W 72/042
   USPC ........ 370/331, 332, 335; 375/219, 260, 267,
                      375/295, 316; 455/452.1, 509
   See application file for complete search history.

(56) References Cited

U.S. PATENT DOCUMENTS

| | | | |
|---|---|---|---|
| 2009/0102715 A1 | 4/2009 | Lou et al. | |
| 2013/0039345 A1 | 2/2013 | Kim et al. | |
| 2013/0072243 A1 | 3/2013 | Yu et al. | |
| 2013/0172002 A1 | 7/2013 | Yu et al. | |
| 2013/0182683 A1 | 7/2013 | Seol et al. | |
| 2014/0056256 A1 | 2/2014 | Kim et al. | |
| 2015/0327267 A1 | 11/2015 | Wilson et al. | |
| 2015/0333878 A1 | 11/2015 | Yu et al. | |
| 2017/0310431 A1* | 10/2017 | Iyer | H04L 1/1819 |
| 2017/0331541 A1* | 11/2017 | Kang | H04L 5/0048 |
| 2018/0270854 A1* | 9/2018 | Lee | H04W 72/042 |
| 2019/0104549 A1 | 4/2019 | Deng et al. | |

FOREIGN PATENT DOCUMENTS

| | | |
|---|---|---|
| KR | 10-2013-0017932 A | 2/2013 |
| KR | 10-2013-0084340 A | 7/2013 |
| KR | 10-2015-0130761 A | 11/2015 |
| WO | 2008/125923 A1 | 10/2008 |
| WO | 2016/086144 A1 | 6/2016 |
| WO | 2017/092803 A1 | 6/2017 |

OTHER PUBLICATIONS

Intel Corporation, "Discussion on Beamforming for NR PDCCH", 3GPP Draft, R1-1609519, Discussion on Beamforming for NR PDCCH R3, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016, XP051149558, Retrieved from the Internet URL:http://www.3gpp.org/ftp/Meetings_3GPP_SYNC/RAN1/Docs/ [retrieved on Oct. 9, 2016].
Extended European Search Report dated Apr. 20, 2020, issued in European Patent Application No. 18832891.8.
Chinese Office Action dated Aug. 13, 2021, issued in Chinese Application No. 201880045395.3.
Huawei et al., Multi-beam transmission for DL control channel, 3GPP TSG RAN WG1 #AH, R1-1710450, Jun. 17, 2017.
ZTE, Multi-TRP Transmission and interference coordination, 3GPP TSG RAN WG1 #89, R1-1707117, May 7, 2017.
InterDigital Communications, Beam-based aspects for New Radio, 3GPP TSG RAN WG2 #96, R2-168466, Nov. 5, 2016.
Korean Office Action dated Jul. 14, 2022, issued in Korean Application No. 10-2020-7004331.

* cited by examiner

FIG. 1
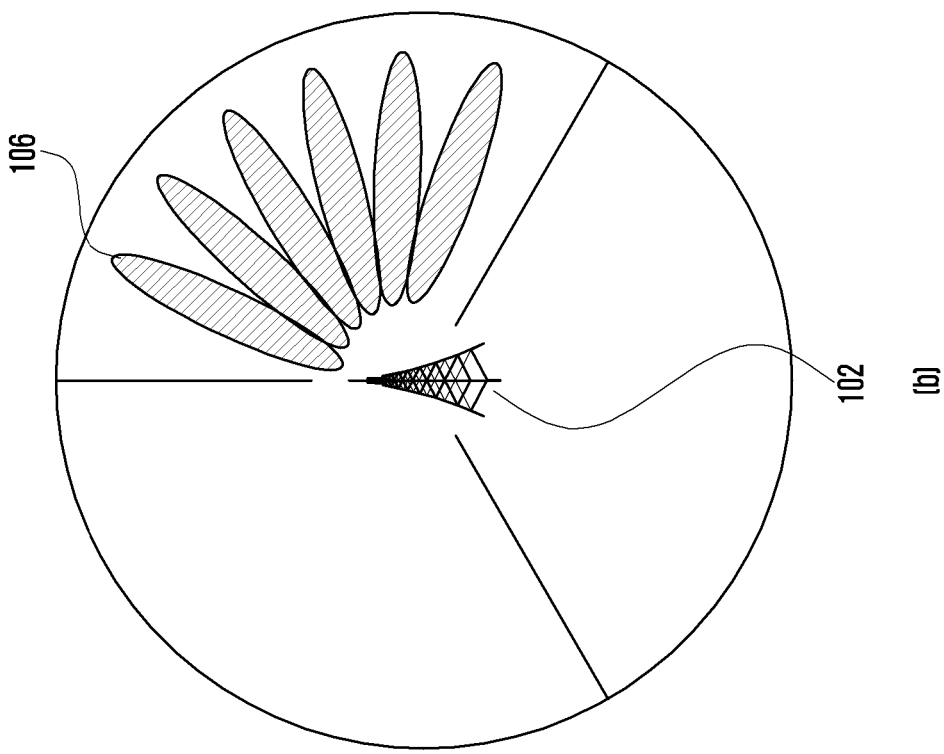
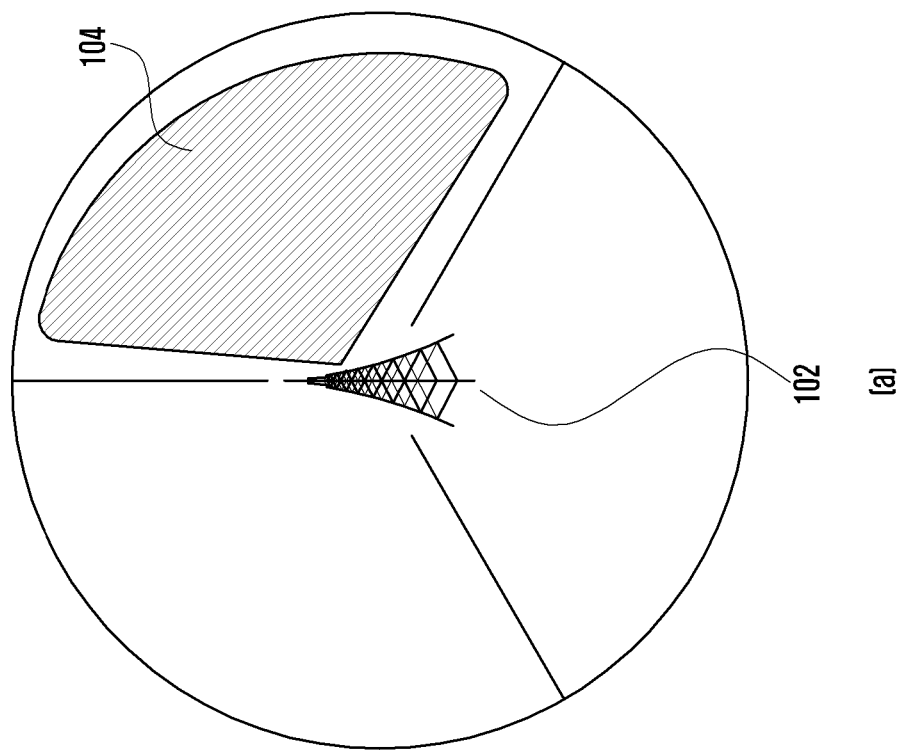

1700

B-HARQ Flag (2 bit)

| 00 | 00 : ACK |
| 01 | 01 : HARQ at NACK |
| 10 | 10 : B-HARQ at NACK |
| 11 | 11 : Reserved |

FIG. 18

Beam Index Bitmap

| 1 | 1 | 1 | 0 | ... | 0 | 0 |

1800

1900

Beam Diversity Flag (1 bit)

| 0 | 0 : HARQ |
| 1 | 1 : B-HARQ |

TRANSRECEIVING METHOD AND APPARATUS APPLYING BEAM DIVERSITY IN WIRELESS COMMUNICATION SYSTEM

TECHNICAL FIELD

The disclosure relates to a wireless communication system, and more particularly, to a method and an apparatus for improving communication performance and radio resource use efficiency by achieving a beam diversity gain using a plurality of beams in a transmission/reception process between a terminal and a base station.

BACKGROUND ART

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE System."

Implementation of the 5G communication system in ultra-high frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems.

In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like.

In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, the Internet, which is a human centered connectivity network where humans generate and consume information, is now evolving to the Internet of things (IoT) where distributed entities, such as things, exchange and process information without human intervention. The Internet of everything (IoE), which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by beamforming, MIMO, and array antennas, which correspond to 5G communication technology. Application of a cloud radio access network (cloud RAN) as the above-described big data processing technology may also be considered to be an example of convergence between the 5G technology and the IoT technology.

On the other hand, in a communication system to which beamforming is applied, it is considered to use a high frequency band as compared with that in the related art. In the case of a high frequency band, a signal has a short wavelength to cause a path loss to occur greatly, and thus various demands for securing a stable communication environment have been increased.

DISCLOSURE OF INVENTION

Technical Problem

The disclosure is derived to solve the above-described problem, and an aspect of the disclosure is to heighten radio resource use efficiency by securing safety of a communication environment using multi-beam through application of beam diversity to transmission and reception using a plurality of beams and reducing a probability of unnecessary transmission occurrence.

Solution to Problem

According to an embodiment of the disclosure to solve the above-described problem, a method by a terminal includes receiving data related to one another from a base station through a plurality of beams; and processing the data related to one another together.

According to an embodiment, the data related to one another may include first data and second data transmitted through different beams, and the first data may be at least partly equal to the second data or may be obtained by adding redundancy information to the second data, and processing may decode the first data and the second data together.

According to an embodiment, the plurality of beams may be beams belonging to a beam candidate group of which a beam gain is measured to be equal to or higher than a threshold value as the result of the beam measurement with the base station, and they may be respectively formed through a plurality of antennas included in the base station.

According to an embodiment, the method may further include transmitting a signal for requesting transmission using the plurality of beams to the base station, or configuring communication using a cross-polarization antenna with the base station.

According to an embodiment, the data related to one another may be initially transmitted data transmitted from the base station or retransmitted data in accordance with a hybrid automatic repeat request (HARQ) procedure, and the method may further include transmitting a retransmission request message including information indicating the plurality of beams to the base station if the data related to one another is the retransmitted data.

According to an embodiment of the disclosure to solve the above-described problem, a terminal includes a transceiver configured to transmit and receive a signal; and a controller configured to: receive data related to one another from a base station through a plurality of beams, and process the data related to one another together.

According to an embodiment of the disclosure to solve the above-described problem, a method by a base station includes selecting a plurality of beams for transmitting data related to one another to a terminal; and transmitting the data related to one another to the terminal through the plurality of beams.

According to an embodiment of the disclosure to solve the above-described problem, a base station includes a transceiver configured to transmit and receive a signal; and a controller configured to: select a plurality of beams for transmitting data related to one another to a terminal, and transmit the data related to one another to the terminal through the plurality of beams.

Advantageous Effects of Invention

According to the embodiments proposed in the disclosure, because the beam diversity can be applied in the transmission/reception process between the base station and the terminal, unnecessary transmission can be prevented from occurring through lowering of an error rate on a receiving end side, and communication stability can be heightened. Further, a situation in which the unnecessary transmission is necessary can be reduced, and thus the radio resource use efficiency can be improved.

BRIEF DESCRIPTION OF DRAWINGS

FIG. 1 is a diagram explaining a wireless communication system to which beamforming is applied.

FIG. 18 is a diagram illustrating a bitmap configuration example according to a proposed embodiment.

MODE FOR THE INVENTION

Figure 2:
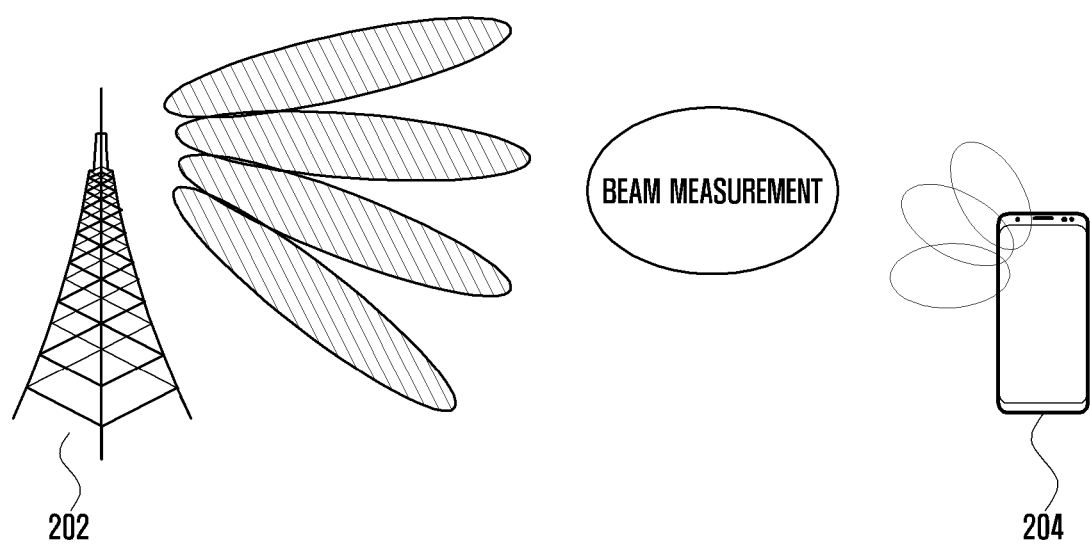
FIG. 2 is a diagram explaining a beam measurement process between a terminal and a base station in a wireless communication system to which beamforming is applied.

Hereinafter, preferred embodiments of the disclosure will be described in detail with reference to the accompanying drawings. In the accompanying drawings, it is to be noted that the same constituent elements are denoted by the same reference numerals. Further, detailed explanation of known functions and configurations that may obscure the subject matter of the disclosure will be omitted.

In explaining the embodiments, explanation of technical contents that are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "unit", as used in an embodiment, means, but is not limited to, a software or hardware component, such as FPGA or ASIC, which performs certain tasks. However, "unit" is not meant to be limited to software or hardware. The term "unit" may advantageously be configured to reside on the addressable storage medium and configured to execute on one or more processors. Thus, "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or further separated into additional components and "units". Further, the components and "units" may be implemented to operate one or more CPUs in a device or a security multimedia card.

Hereinafter, with reference to the accompanying drawings, preferred embodiments of the disclosure will be described in detail.

FIG. 1 is a diagram explaining a wireless communication system to which beamforming is applied.

In a general wireless communication system, a base station 102 performs communication with a terminal located in a coverage through generation of a beam 104 that reaches a specific area (or cell) of the coverage ((a) of FIG. 1). However, as described above, in the next generation communication system, schemes for using an ultrahigh frequency band to achieve a high data rate have been discussed.

Because the frequency band that is used in the next generation communication system has a relatively severe path loss, it has been discussed to perform communication using a narrow beam by applying beamforming to increase the transfer distance of radio waves. For example, as illustrated as (b) of FIG. 1, a base station 102 of a communication system to which beamforming is applied may generate a plurality of beams 106 through beamforming and it may use the generated beams for communication with a terminal.

FIG. 2 is a diagram explaining a beam measurement process between a terminal and a base station in a wireless communication system to which beamforming is applied. In a wireless communication system to which beamforming is applied, a beam pair composed of a transmission beam of a transmitting end and a reception beam of a receiving end is used for data transmission/reception between a terminal and a base station, and in the case of applying the beamforming, a narrow beam is formed to have directivity, and thus it is important to search for a best beam between a terminal 204 and a base station 202. In particular, in the case where the terminal moves, the channel environment may be changed every moment, and thus it may be necessary for the base station and the terminal to search for the best beam to be used for their mutual communication and to share corresponding information. The best beam search process is called a beam measurement process, and the terminal and the base station search for the best beam to be used for the communication through sweeping (or changing) of a transmission beam and a reception beam.

Meanwhile, in the above-described beamforming system, a multiple input multiple output (MIMO) technology for the base station to communicate with the terminal using a plurality of antennas has been discussed. According to such a MIMO technology, different data packets are transmitted using the plurality of antennas provided in the base station, and thus the total communication capacity is increased as the number of antennas is increased.

In such a beamforming system, various communication schemes may be used in addition to the MIMO technology. However, there is a need for more detailed schemes for heightening the communication stability and radio resource use efficiency using the characteristics of the beamforming system.

Hereinafter, an embodiment is proposed to heighten the communication stability and the radio resource use efficiency in the above-described communication system to which the beamforming is applied. In particular, the proposed embodiment proposes a scheme for lowering a probability of decoding error occurrence in the receiving end and securing the communication stability by making it possible to obtain a beam diversity gain in the transmission/reception process using the characteristics of the beamforming system.

Figure 3:
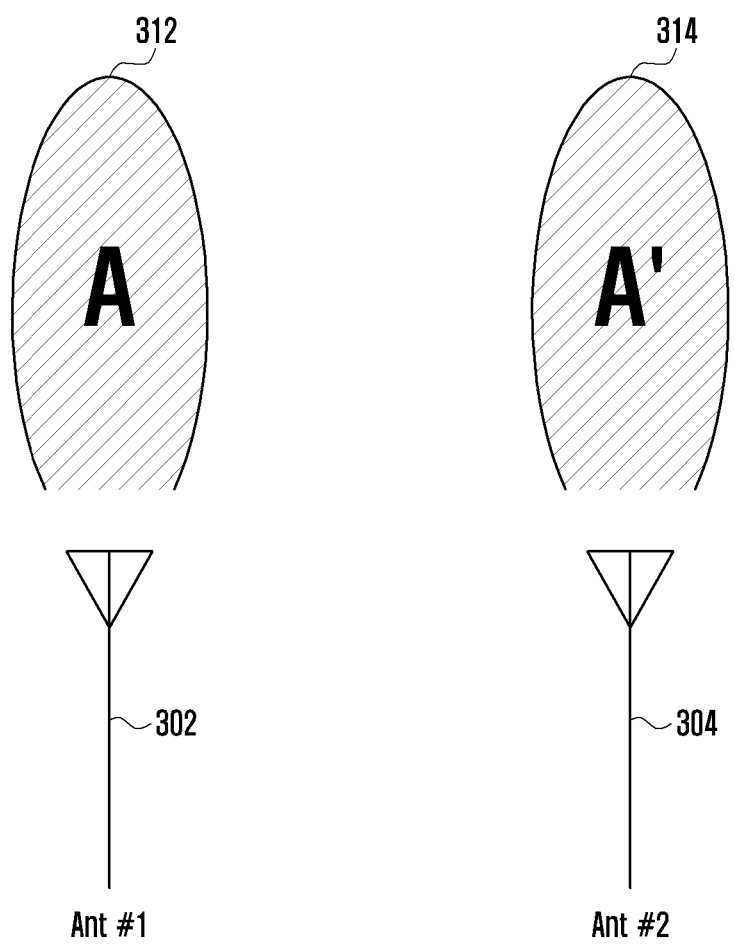
FIG. 3 is a diagram explaining a beam operation method by a transmitting end if beam diversity is applied according to a proposed embodiment.

FIG. 3 is a diagram explaining a beam operation method by a transmitting end if beam diversity is applied according to a proposed embodiment. In FIG. 3, antenna #1 302 and antenna #2 304 are antennas of a transmitting end, and the transmitting end of FIG. 3 may correspond to both a base station and a terminal. Further, although FIG. 3 illustrates that the transmitting end includes two antennas, it is merely exemplary, and the transmitting end may include a plurality of antennas. Further, the shape or the deployment structure of the antenna illustrated in FIG. 3 is simply for convenience in explanation, and the antenna shape or the deployment structure of the antenna is not limited thereto.

According to the proposed embodiment, the transmitting end transmits data to the receiving end by applying beamforming in different directions with respect to antenna #1

302 and antenna #2 304. In other words, the transmitting end performs communication with the receiving end using a plurality of beams formed through the plurality of antennas, and the beams formed by the respective antennas may be independent of each other.

In this case, the transmitting end according to the proposed embodiment may transmit a data packet (hereinafter, data #2) related to a data packet (hereinafter, data #1) that is transmitted through a specific beam (e.g., beam by antenna #1 302) through another beam (e.g., beam by antenna #2 304). Specifically, the transmitting end may transmit data #1 to the receiving end through the beam formed by antenna #1 302 while transmitting data #2 related to data #1 to the receiving end through the beam formed by another antenna #2 304. In this case, data #2 may be data including redundancy information on data #1, and for example, data #2 may data equally including a part or the whole of data #1. In other words, the transmitting end may transmit data packets at least parts of which overlap each other to the receiving end through respective beams formed by different antennas.

As described above, the transmitting end transmits the redundancy information at least parts of which overlap each other to the receiving end through the plurality of beams, and thus the receiving end can obtain diversity gains from different beams. The signals transmitted through different beams are transferred to the receiving end on different channels, and thus the receiving end can obtain the beam diversity gain in a process of processing the data packets received through the plurality of beams.

As described above, the transmitting end may transmit data related to each other through the different beams so that the beam diversity gain is obtained in the receiving end. As described above, the two pieces of data may be at least partly equal to each other, and for example, the transmitting end may transmit data #1 (data packet A) through the beam 312 by antenna #1 302, and it may transmit data #2 (data packet A') through the beam 314 by antenna #2 304. Description of the two data packets A and A' means that the data transmitted through the two beams may be related to each other. For example, data packet A and data packet A' may be completely the same data, and data packet A' may be data obtained by adding the redundancy information (for example, parity bit and so on) to data packet A.

According to the above-described embodiment, as the transmitting end transmits data related to each other to the receiving end through the plurality of beams, the diversity gain may occur in the receiving end. In other words, as the data related to each other is transmitted to the receiving end through the beams in the different paths, the receiving end having processed the data together can stably decode the data. According to the embodiment, even in a frequent radio wave blocking situation in the communication system to which the beamforming is applied, probability of transmission failure can be reduced, and thus probability that a decoding error of a received signal occurs in the receiving end can be reduced. Further, because the probability that the receiving end requests retransmission is reduced, a situation in which unnecessary retransmission is performed can be prevented from occurring. Further, because the transmitting end can diversely select retransmitted beam combinations, it is also possible to maximize the diversity gain in accordance with the communication environment, and thus the diversity gain can be maximized even in a situation in which radio resources are limited. In other words, a process in which the transmitting end selects the plurality of beams used for the signal transmission may be used as a means for transferring the redundancy information to the terminal.

Hereinafter, with reference to FIGS. 4 and 5, a detailed process in which a transmitting end selects a beam and transmits and receives a signal in order to perform transmission to which beam diversity is applied will be described according to the embodiment as described above with reference to FIG. 3. First, FIG. 4 is a diagram explaining a process in which a transmitting end and a receiving end select a beam candidate group (or transmission/reception beam pair) if beam diversity is applied according to a proposed embodiment.

As described above with reference to FIG. 2, the terminal and the base station may search for a best beam through a beam measurement process as changing a transmission beam and a reception beam. In the proposed embodiment, the terminal and the base station may select a beam candidate group composed of two or more beams in accordance with the result of the beam measurement process, and they may obtain a beam diversity gain through transmission/reception of a signal simultaneously using the beams belonging to the beam candidate group.

Figure 4:
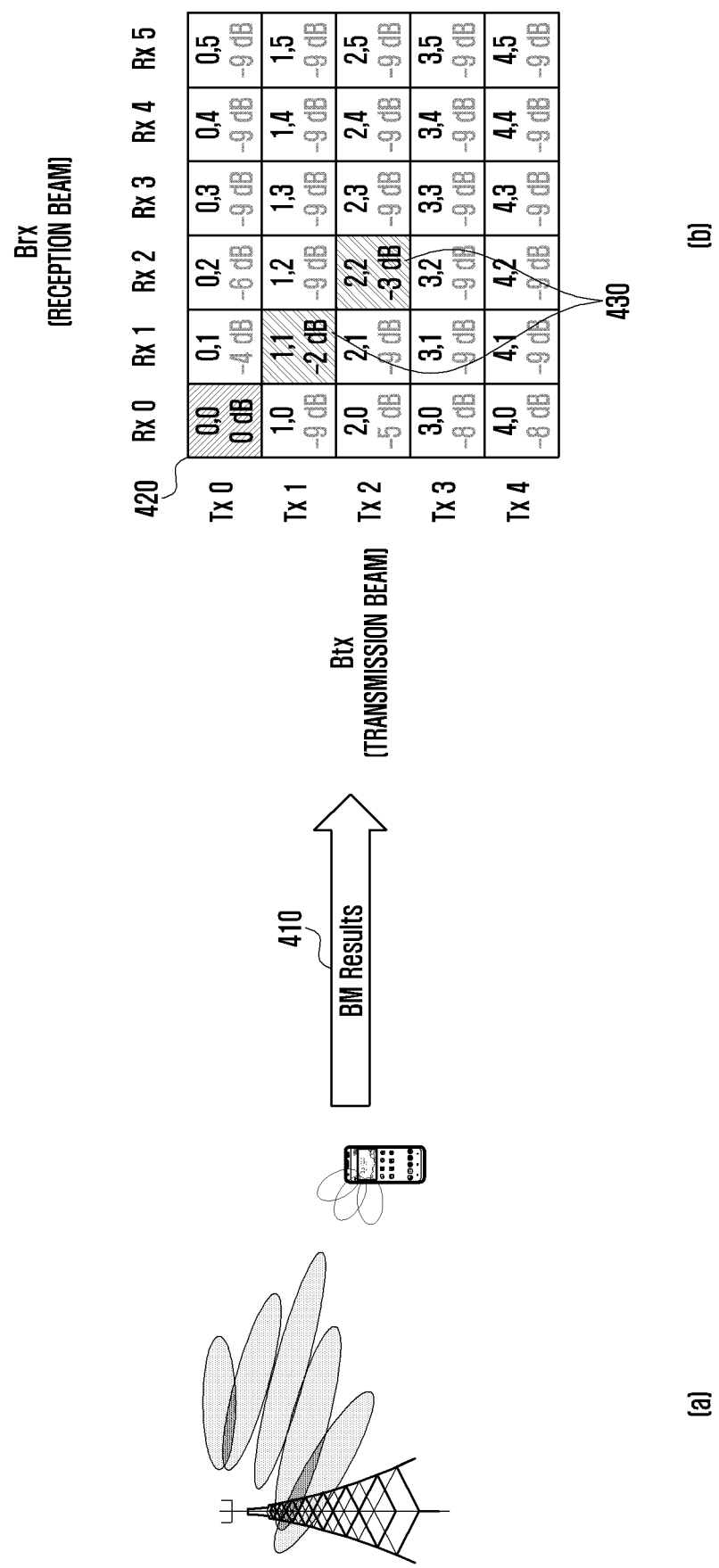
FIG. 4 is a diagram explaining a beam candidate group selection process if beam diversity is applied according to a proposed embodiment.

Specifically, as illustrated as (a) of FIG. 4, the terminal and the base station perform the beam measurement process as changing the beams between them. The beam measurement process may mean a process of searching for the best beam of the beam combination between the transmitting end and the receiving end. For example, the beam measurement process may be performed in a manner that the transmitting end periodically transmits a beam reference signal (BRS) to the receiving end through a specific transmission beam, and the receiving end receives the corresponding reference signal through a specific reception beam and performs measurement of a beam reference signal received power (BRSRP). As described above, by performing the measurement of the BRSRP of the received signal as changing the combination of the transmission beam and the reception beam, the transmitting end and the receiving end may identify the best beam combination. However, the beam measurement process is not limited to the above-described example, and it may be performed in other various methods.

The terminal may acquire the beam measurement result 410 in accordance with the procedure as illustrated as (a) of FIG. 4, and thus the terminal may grasp that through combination of what reception beam and what transmission beam of the base station the highest beam gain can be obtained. In addition, through the beam measurement result 410, the terminal may separately identify the beam gains that occur in accordance with the combination of the reception beam and the transmission beam. The terminal may perform such beam measurement periodically or aperiodically, and it may report the beam measurement result 410 to the base station to share the corresponding beam measurement result with the base station.

As illustrated as (b) of FIG. 4, it is exemplified that the base station has four transmission beams Tx0 to Tx4, and the terminal has 6 reception beams Rx0 to Rx4. Hereinafter, (n, m) means a combination of a transmission beam Txn of the base station and a reception beam Rxm of the terminal (n is a transmission beam index of the base station, and m is a reception beam index of the terminal). As illustrated as (b) of FIG. 4, in the case of (0, 0) in which the transmission beam Tx0 of the base station and the reception beam Rx0 of the terminal are combined, the beam gain appears as 0 dB (420), and this is the highest beam gain of 30 beam combinations in total. Accordingly, the terminal and the base station select the beam combination (0, 0) as the best beam combination.

Further, in the case of the beam combination (1, 1) or (2, 2) (430), it may not be the best beam combination, but it may be a beam combination that satisfies a specific threshold value for the beam gain, and the terminal and the base station may identify that the beam combination (1, 1) or (2, 2) secures a sufficient beam gain for the communication with the base station. For example, if the threshold value is configured to 3 dB, beam combinations (0, 0), (1, 1), and (2, 2) may be selected as a beam candidate group that satisfies the specific threshold value.

The beam combination selected as the beam candidate group as described above may be used in the following transmission/reception process between the base station and the terminal, and as described above with reference to FIG. 3, the base station may select the plurality of beams in the beam candidate group when selecting the plurality of beams to transmit a data packet, the beam through which the signal can reach the receiving end with sufficient intensity may be used for data transmission. As described above, as the receiving end receives the data with sufficient strength through the plurality of beams, the above-described beam diversity gain can be obtained.

The terminal and the base station may calculate beam gains, and share, store, and manage the values with respect to not only the best beam combination but also all combinations of the transmission beam and the reception beam, and as illustrated as (b) of FIG. 4, such beam measurement result values are expressed in the form of a matrix.

According to another embodiment, the terminal may notify the base station of only the best beam to be used to perform communication, and may not report the results of all the beam measurement processes to the base station. If the base station does not know the results of all the beam combinations as described above, the base station may select the beam candidate group while equally fixing the reception beams of the terminal. For example, if the terminal does not report the result of all the beam combinations in a situation in which the best beam combination is (0, 0) as illustrated as (b) of FIG. 4, the base station may select a part of the beam combination composed of the reception beam Rx0 of the terminal. That is, the base station may select the beam combination for signal transmission among the beam combinations constituting the first column on the vertical axis as illustrated as (b) of FIG. 4.

Then, with reference to FIG. 5, a transmission process to which beam diversity is applied according to a proposed embodiment will be described. That is, with reference to FIG. 5, a process in which the transmitting end (base station is exemplified in FIG. 5) transmits a signal by applying beam diversity based on the beam measurement result received from the receiving end (terminal is exemplified in FIG. 5) according to the embodiment as described above with reference to FIGS. 3 and 4 will be described.

First, the terminal performs the beam measurement using a specific signal (e.g., beam reference signal) received from the base station (510), and it reports the beam measurement result to the base station (520). The base station selects the beam to be used when the base station transmits the signal based on the beam measurement result received from the terminal (530), and the base station may select a plurality of different beams so that the terminal that is the receiving end can obtain the beam diversity gain. Then, the base station transmits the signal to the terminal using the selected plurality of beams (540). In this case, the base station may transmit data related to each other through the plurality of beams, and for example, the data that is transmitted through a specific beam may be obtained by adding redundancy information to the data transmitted through another beam, or may be at least partly equal to the corresponding data. As described above, the beam diversity gain occurs due to the beams passing through different paths, and the terminal having received the data related to each other through the plurality of beams can stably decodes the corresponding data. For example, the terminal can combine and process two pieces of data received through different beams.

Then, an embodiment in which the transmitting end determines whether to perform the transmission to which the beam diversity is applied when transmitting the signal to the receiving end according to the above-described embodiment will be described. In order to obtain the beam diversity gain through processing of the signals received through different beams, it is required for the receiving end to know in advance that the transmission to which the beam diversity is applied is to be performed. Accordingly, the terminal and the base station should know in advance whether the above-described embodiment is to be applied during transmission of the signals. For this, whether to apply the embodiment may be determined through an implicit method between the terminal and the base station or through an explicit method. First, the implicit method will be described through embodiments of FIGS. 6 and 7.

Figure 6:
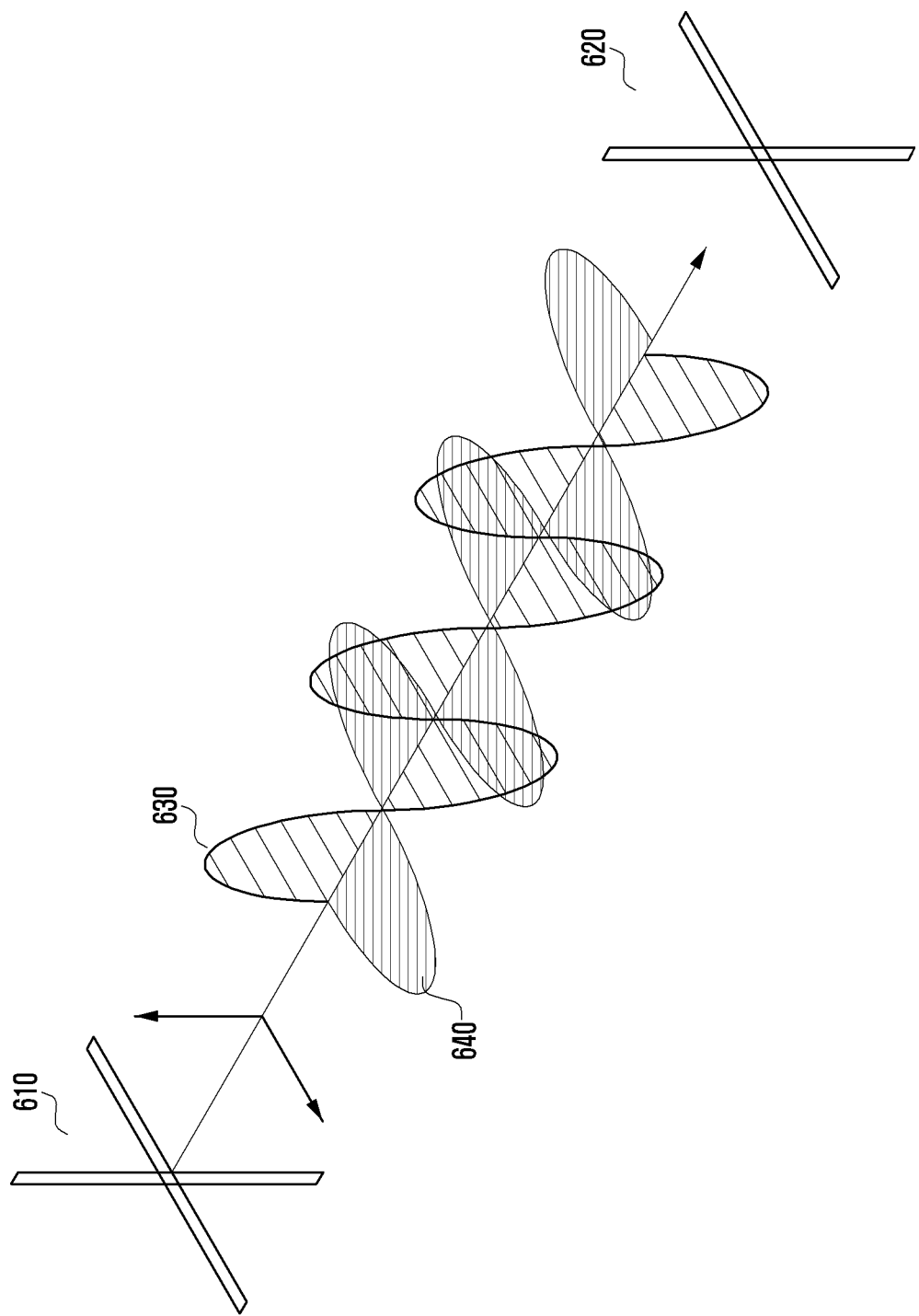
FIG. 6 is a diagram explaining an operation of a cross-polarization antenna according to a proposed embodiment.

FIG. 6 is a diagram explaining an operation of a cross-polarization antenna according to a proposed embodiment. A cross-polarization antenna means an antenna configuration capable of generating a radio frequency (RF) signal with horizontal polarization and vertical polarization. The cross-polarization antenna 610 of the transmitting end according to the embodiment illustrated in FIG. 6 may generate a signal 630 having a vertical polarization and a signal 640 having a horizontal polarization, respectively, and orthogonality is established between the two signals to cause no interference between the two signals.

Accordingly, if the cross-polarization antennas 610 and 620 are configured in the transmitting end and the receiving end, and even if the transmitting end transmits a signal through a beam having the horizontal polarization and transmits a signal through another beam having the vertical polarization, interference does not exert an influence between the two signals, and thus the receiving end can obtain the beam diversity gain. That is, if the respective cross-polarization antennas 610 and 620 are configured in the transmitting end and the receiving end and it is engaged that transmission/reception using the cross-polarization antennas is possible, the transmitting end and the receiving end can perform the transmission to which the beam diversity is applied even if there is not a separate signaling or request. This method corresponds to the implicit method as described above.

Figure 7:
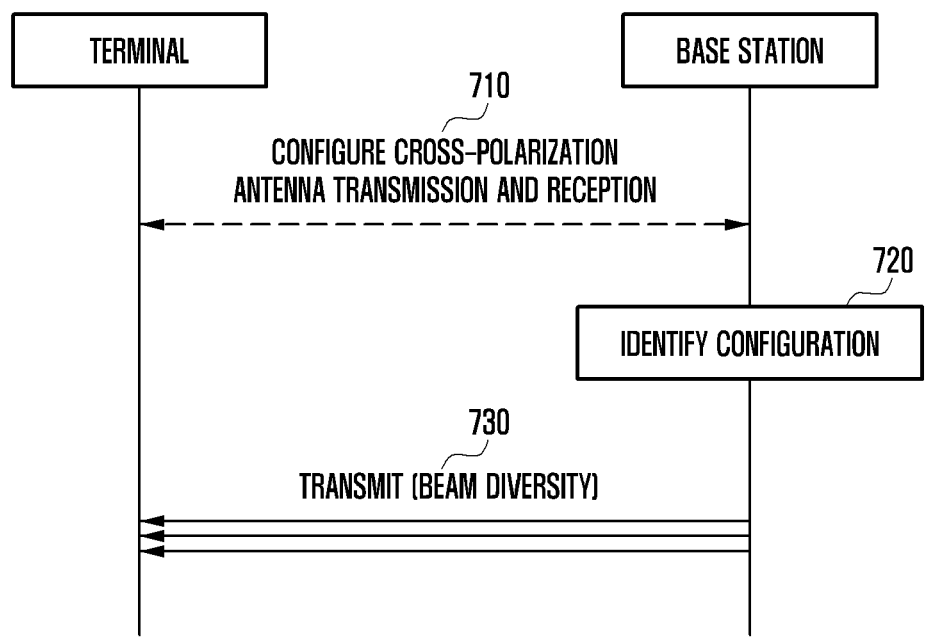
FIG. 7 is a flowchart explaining a transmission process if a cross-polarization antenna is configured according to a proposed embodiment.

This will be described in more detail through FIG. 7. FIG. 7 is a flowchart explaining a transmission process if a cross-polarization antenna is configured according to a proposed embodiment. The base station and the terminal are respectively provided with cross-polarization antennas, and they can pre-exchange information that the transmission/reception using such cross-polarization antennas is possible (710). In other words, the transmission/reception using the cross-polarization antennas may be configured between the terminal and the base station. If the base station identifies that the transmission/reception using the cross-polarization antennas is configured before transmitting the signal to the terminal (720), the base station may apply the beam diversity according to the above-described embodiment when transmitting the signal to the terminal (730). In other words, the base station may configure the beam having the horizontal polarization and the beam having the vertical polarization, respectively, and it may transmit data related to each other and at least partly equal to each other or data added with redundancy information through two beams. Accordingly, the two beams do not exert an influence on each other, and thus the terminal that is the receiving end may receive the signals received through the two beams and it may obtain the beam diversity gain through processing data included in the received signals together.

Figure 8:
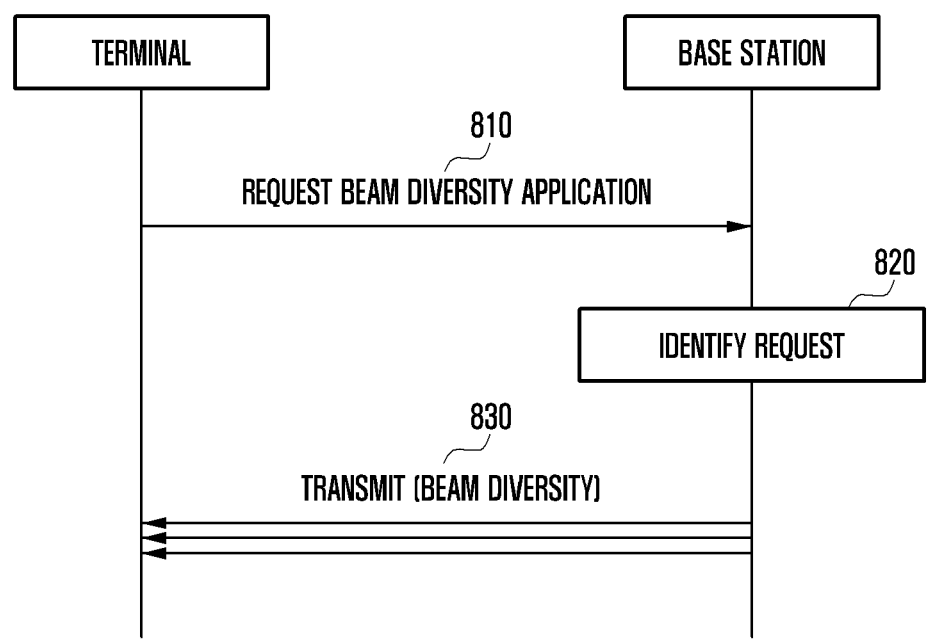
FIG. 8 is a flowchart explaining a transmission process if a cross-polarization antenna is not configured according to a proposed embodiment.

In contrast with this, with reference to FIG. 8, a method for performing transmission/reception to which beam diversity is applied through an explicit method will be described. FIG. 8 is a flowchart explaining a transmission process if a cross-polarization antenna is not configured according to a proposed embodiment.

If a cross-polarization antenna is not provided in at least one of a terminal or a base station, or if it is not configured to perform transmission/reception using cross-polarization antennas, it is required for the receiving end to know in advance that the transmission to which the beam diversity is applied is to be performed according to the above-described embodiment. Because the transmission to which the beam diversity is applied refers to reception of the data related to each other through different beams, it is required for the receiving end to know in advance the transmission to which the beam diversity is applied in order to obtain the beam diversity gain through processing of the corresponding data together.

Accordingly, if the terminal requests transmission to which the beam diversity is applied from the base station (810), the base station having received and identified such a request (820) may transmit the data to the terminal by applying the beam diversity during the following transmission (830). In other words, if an explicit request is made from the terminal, the base station may transmit the signal to the terminal by applying the beam diversity. In contrast with the illustrated example, it is also possible for the base station to notify the terminal that the transmission to which the beam diversity is applied is to be performed, and to transmit the signals through the plurality of beams by applying the beam diversity during the following transmission.

As described above, the embodiment in which the transmitting end transmits the data related to each other through the plurality of beams during the transmission of the signals to the receiving end, and the receiving end obtains the beam diversity gain by processing the data received through the plurality of beams together. On the other hand, the above-described embodiments may be applied even to a process in which the transmitting end retransmits the data to the receiving end. Hereinafter, an embodiment in which the transmission to which the beam diversity is applied as described above is applied in the retransmission process of the wireless communication system will be described.

Figure 9:
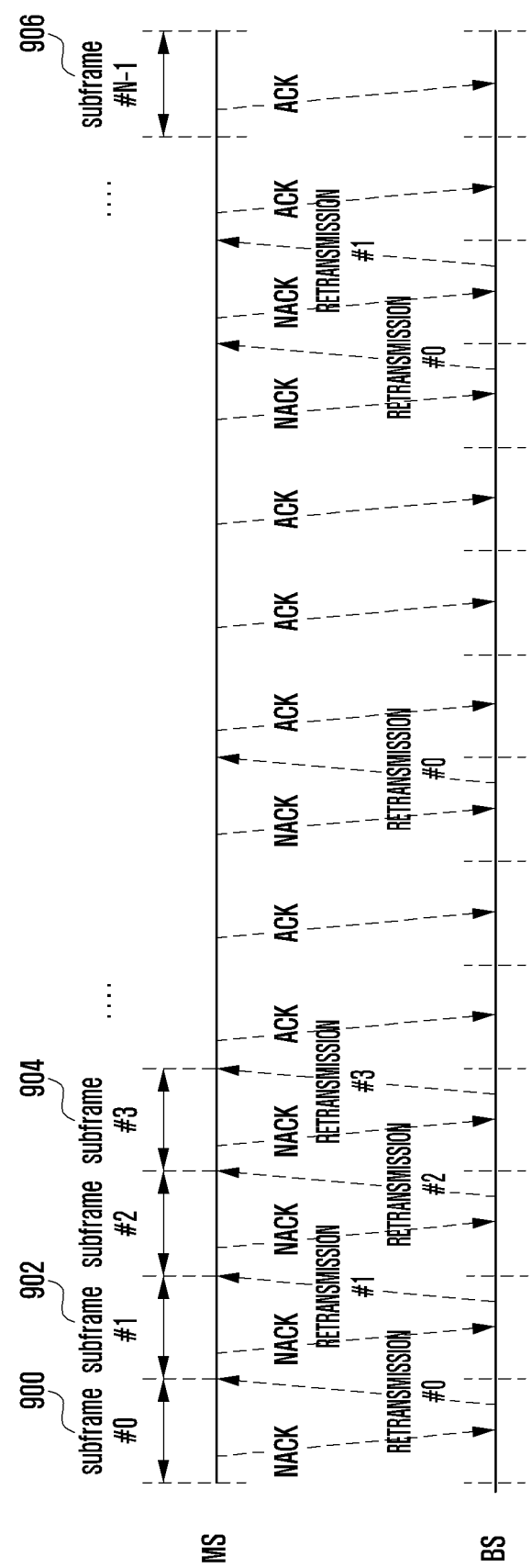
FIG. 9 is a diagram illustrating a retransmission process of a wireless communication system.

FIG. 9 is a diagram illustrating a retransmission process of a wireless communication system. In an LTE/LTE-A communication system, data retransmission is performed in accordance with a hybrid automatic repeat request (HARQ) procedure. The HARQ procedure will be briefly described. The receiving end generates acknowledgment/negative acknowledgment (ACK/NACK) in accordance with whether decoding has succeeded after receiving an initially transmitted signal, and it transmits the generated ACK/NACK to the transmitting end. The transmitting end having received the NACK from the receiving end may iteratively retransmit the data (e.g., packet in which an error has occurred) until receiving the ACK, and the transmitting end may retransmit the signal up to the number of times of predetermined maximum retransmission.

As exemplarily illustrated in FIG. 9, if the NACK is received from the terminal in subframe #0 900, the base station retransmits the data initially transmitted to the terminal. If data decoding has successively failed in subframe #1 902, #2, and #3 904, the terminal transmits the NACK to the base station, and the base station retransmits the data until the ACK is received.

According to the HARQ procedure as described above, because the retransmission should be continuously performed, it may be required to secure radio resources for a long time and time required until the data processing may be greatly delayed. In particular, if the channel situation is unstable in the next generation communication system, retransmission in accordance with the HARQ procedure may occur more frequently, and thus it may be necessary to improve the retransmission procedure from the viewpoint of efficient usage of radio resources. This is because it may be difficult to ordinarily secure radio resources for the HARQ retransmission. Further, during the retransmission, the terminal is unable to successfully decode the packet, and it may be necessary to improve the retransmission procedure even from the viewpoint of reducing such an unstable time.

The above-described embodiment may be applied to solve the above-described problem, and hereinafter, an embodiment in which the beam diversity is applied in the retransmission process so that the retransmitted data can be stably performed will be described. For convenience in explanation, this embodiment is hereinafter referred to as the retransmission to which the beam diversity is applied.

Figure 10:
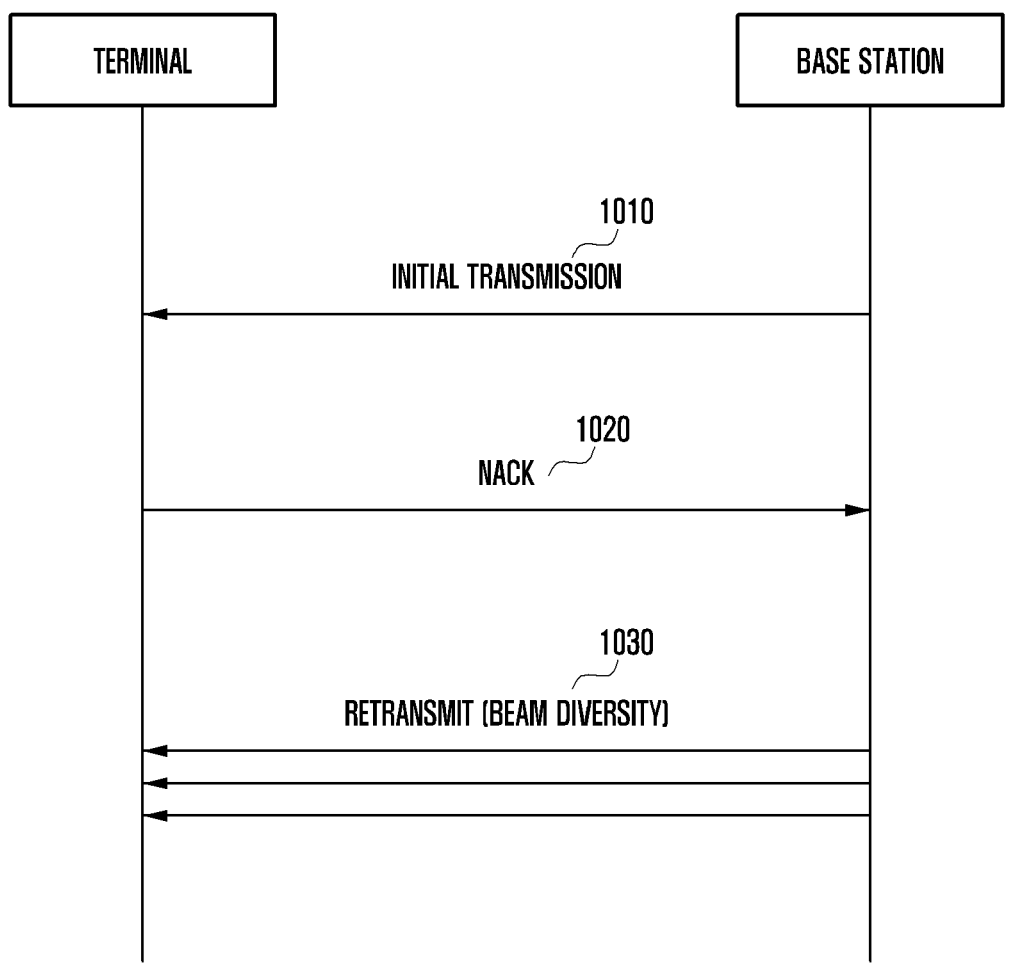
FIG. 10 is a flowchart explaining a retransmission process to which beam diversity is applied according to a proposed embodiment.

FIG. 10 is a flowchart explaining a retransmission process to which beam diversity is applied according to a proposed embodiment. As described above, in a general retransmission procedure, packets are iteratively retransmitted until ACK is received with respect to an initial transmission transmitted through a radio interval. The HARQ retransmission procedure has the problem that in the case of the terminal that is in a standstill state or has a low mobility, data in which an error has occurred in the packet decoding process has a high probability of error re-occurrence even if the data is retransmitted. That is, if a situation in which a radio channel between the base station and the terminal is not good is maintained, there is a high possibility that the same retransmitted data is not normally transferred to the terminal.

In order to solve this problem, in an embodiment of the disclosure, a scheme for applying beam diversity during transmission of retransmitted data is proposed. In the case where the beam diversity is applied, the retransmitted data is transferred through different combinations of transmission beams and reception beams, the retransmitted data may be transmitted to the receiving end on different channels.

In particular, in the case of the different combinations of the transmission beams and the reception beams during initial transmission and retransmission, and in the case where the data is transmitted through a plurality of beam combinations during retransmission, the diversity gain may be maximized. The terminal (or base station in an uplink) having received the retransmitted data to which the beam diversity is applied can obtain the diversity gain when performing soft combining, and thus a probability of error occurrence during processing of the retransmitted data can be minimized. Further, the transmitting end can perform retransmission using different beams even without additional radio resource allocation for the retransmission, and thus even in a situation in which radio resources for the retransmission is not sufficient, it is possible to provide the diversity gain of the receiving end.

With reference to FIG. 10, a detailed operation process will be described. Although FIG. 10 exemplarily illustrates a downlink whereby data is transmitted from the base station to the terminal, it is also possible to apply the embodiment even with respect to an uplink in a similar manner.

The base station transmits initial data to the terminal (1010). In this case, the initial data that the base station transmits to the terminal may be transmitted through a general transmission scheme to which the beam diversity is not applied, it may be transmitted through a transmission scheme to which the beam diversity is applied by transmitting the data related to each other through a plurality of beams according to the embodiments as described above with reference to FIGS. 2 to 8.

If an error occurs in a process of decoding the initial data received by the terminal, the terminal transmits NACK for requesting retransmission from the base station (1020). Then, the base station retransmits the packet in which the error has occurred to the terminal in accordance with the NACK received from the terminal (1030). In this case, the base station may transmit the retransmitted data through a plurality of beams when transmitting the retransmitted data to the terminal. In other words, the base station may apply the beam diversity in transmitting the retransmitted data by transmitting, through another beam, retransmitted data (e.g., data at least partly equal to data B or data B' obtained by adding redundancy information to data B) related to the retransmitted data (e.g., data B) transmitted through a specific beam. In the retransmission process, the base station may make it possible to generate the diversity gain between the initial transmission and the retransmission using the combination of the transmission beam and the reception beam that is different from the initial transmission. Further, the base station may make it possible to obtain the beam diversity gain from the retransmitted data received by the terminal by transmitting the retransmitted data to the terminal through a plurality of different beam combinations.

As described above, in the case where the transmission scheme to which the beam diversity is applied according to the previously proposed embodiment is combined with the existing HARQ retransmission procedure to be performed, the retransmission scheme may be called HARQ retransmission using beams, and hereinafter, it is simply expressed as beam HARQ or B-HARQ.

Figure 11:
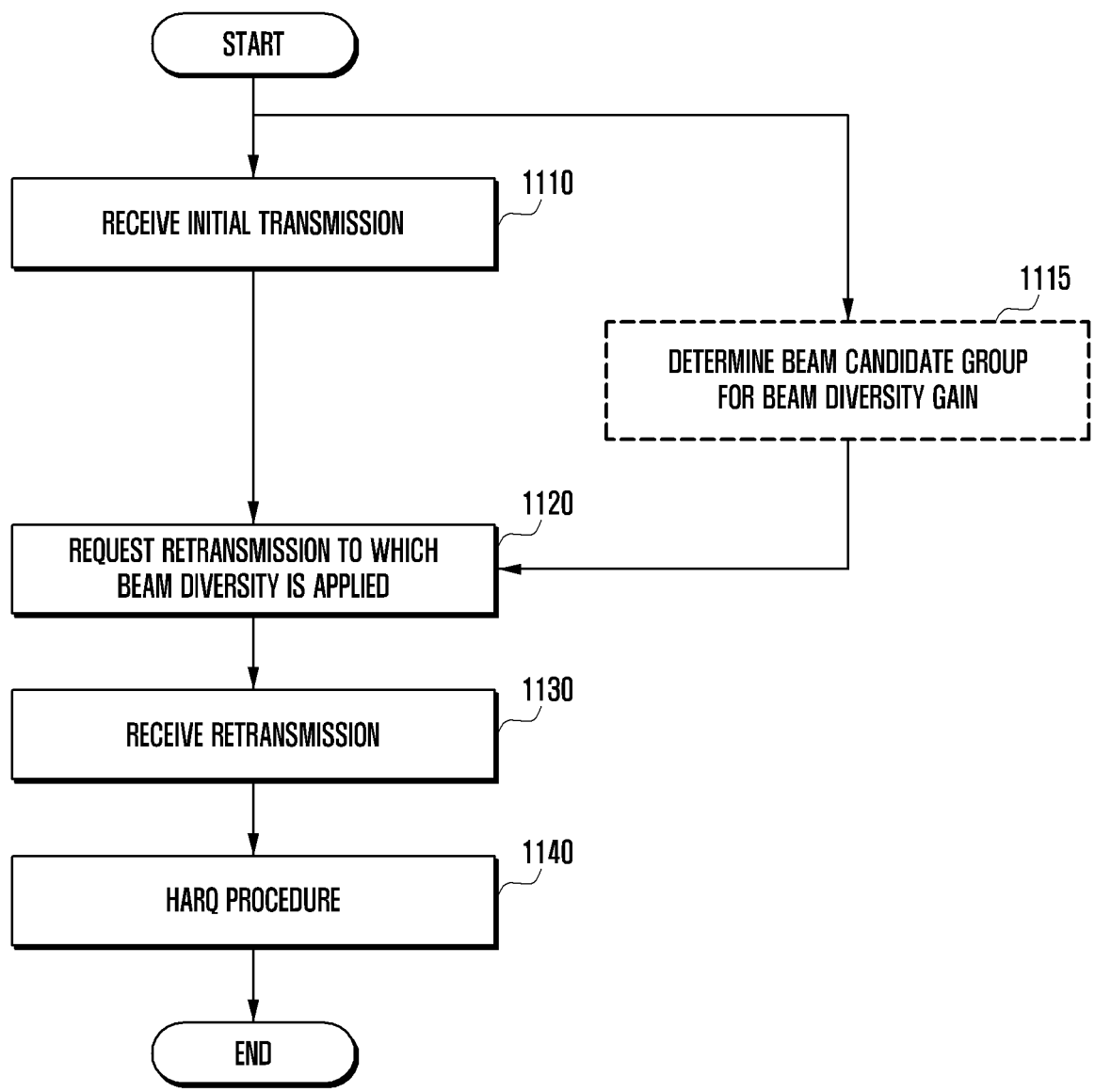
FIG. 11 is a flowchart explaining an operation of a terminal in a retransmission process to which beam diversity is applied according to a proposed embodiment.
Figure 12:
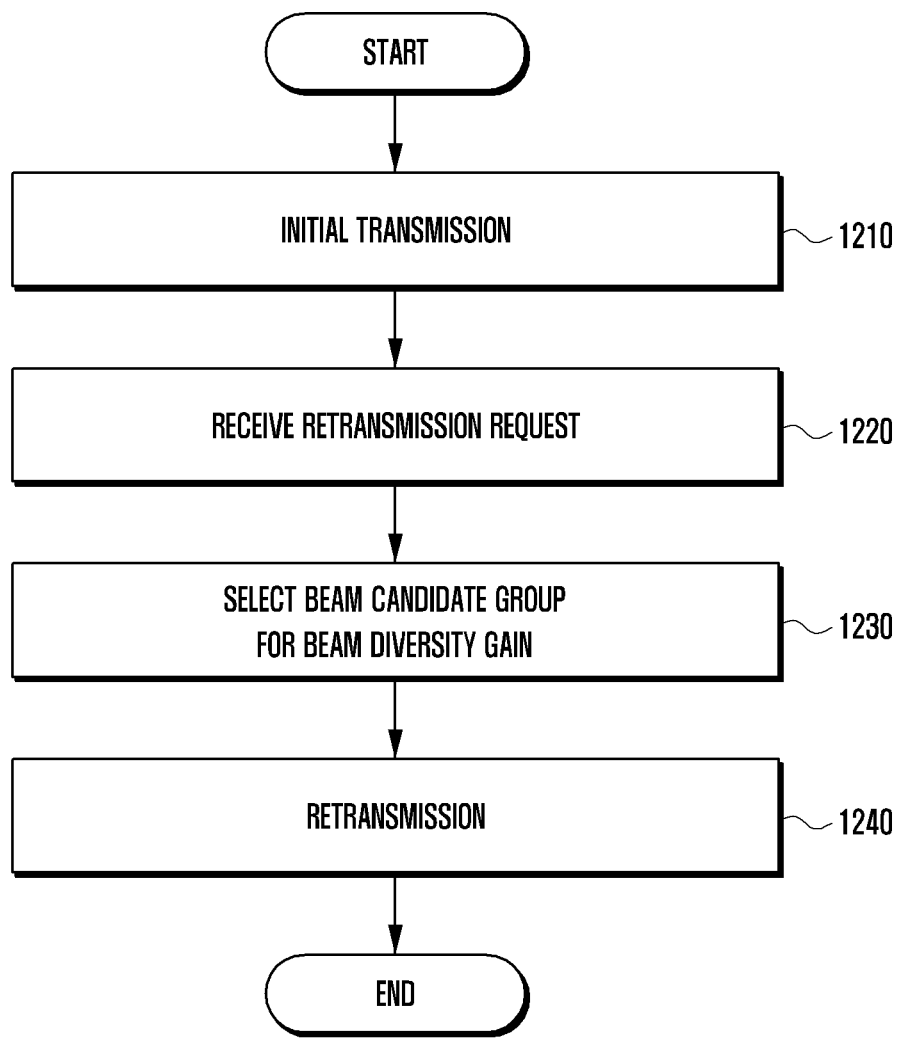
FIG. 12 is a flowchart explaining an operation of a base station in a retransmission process to which beam diversity is applied according to a proposed embodiment.

FIGS. 11 and 12 are flowcharts explaining operations of a terminal and a base station in a retransmission process to which beam diversity is applied according to a proposed embodiment.

With reference to FIG. 11, the terminal receives initially transmitted data transmitted from the base station (1110), and if an error occurs in the received data, the terminal should request retransmission by transmitting NACK to the base station. In this case, in order to obtain the diversity gain from the retransmitted data, the terminal may request the retransmission to which the beam diversity is applied (1120). Although FIG. 11 illustrates an embodiment in which application of the beam diversity is requested in accordance with an implicit method among the previously explained embodiments, it is also possible to apply an embodiment in which application of the beam diversity is requested in accordance with an explicit scheme according to another embodiment.

As described above, the retransmission to which the beam diversity is applied may mean a process of retransmitting the data through a beam combination that is different from that of the initial transmission or it may mean a process of retransmitting the data through a plurality of different beam combinations. Meanwhile, the terminal may determine a beam candidate group for obtaining the beam diversity gain in the retransmission process (1115), and it may transfer information on the determined beam candidate group together during the retransmission request. Further, in contrast with the illustrated embodiment, the terminal may determine in advance the beam candidate group before receiving the initially transmitted data, and in this case, the process (1115) of FIG. 11 may be performed prior to the process (1110).

After transmitting a signal for requesting the retransmission to which the beam diversity is applied, the terminal receives the data that is retransmitted from the base station (1130). The retransmitted data is transmitted to the terminal in a state where the beam diversity is applied to the data, and the terminal performs decoding by soft-combining the retransmitted data with the initially transmitted data in accordance with the HARQ procedure (1140). In this case, because the terminal can obtain the diversity gain from the retransmitted data to which the beam diversity is applied, a probability of successfully decoding the retransmitted data can be maximized.

FIG. 12 is a flowchart explaining an operation of a base station in a retransmission process to which beam diversity is applied according to an embodiment of the disclosure. In FIG. 12, the base station transmits data to the terminal (1210), and it may receive a signal for requesting retransmission from the terminal due to an error occurrence in the initially transmitted data (1220). In this case, as described above with reference to FIG. 11, the terminal may request application of the beam diversity during the retransmission, and information for the terminal to request the application of the beam diversity with respect to the retransmission may be configured in various schemes.

Meanwhile, the base station having been requested the retransmission to which the beam diversity is applied from the terminal selects a beam candidate group for providing the beam diversity gain to the terminal (1230), and it performs the retransmission using the selected beam candidate group (or beam combination) (1240). The beam candidate group (or beam combination) selected for the retransmission to which the beam diversity is applied may be a beam candidate group (beam combination) that is different from that of the initial transmission, and a plurality of different beam candidate groups (beam combinations) may be selected so that the beam diversity gain can be generated only through the retransmission. In the latter case, the retransmitted data received by the terminal may be the data related to each other (e.g., data received through any one beam and at least partly equal to the data received through another beam, or data added with redundancy information). The terminal having received the retransmitted signal that is transmitted through application of the beam diversity may perform decoding by soft-combining the initially transmitted data and the retransmitted data in accordance with the HARQ procedure.

As described above, the beam diversity may be applied in the data retransmission process between the base station and the terminal, and the receiving end having received the retransmitted signal to which the beam diversity is applied may obtain the diversity gain in the decoding process, resulting in that the decoding probability can be heightened and a stable communication performance can be secured. In particular, in the case of securing the diversity gain through the retransmitted data received through various beam paths, unnecessary retransmission can be prevented from being repeated, and thus the latency and radio resource efficiency can also be increased.

Figure 13:
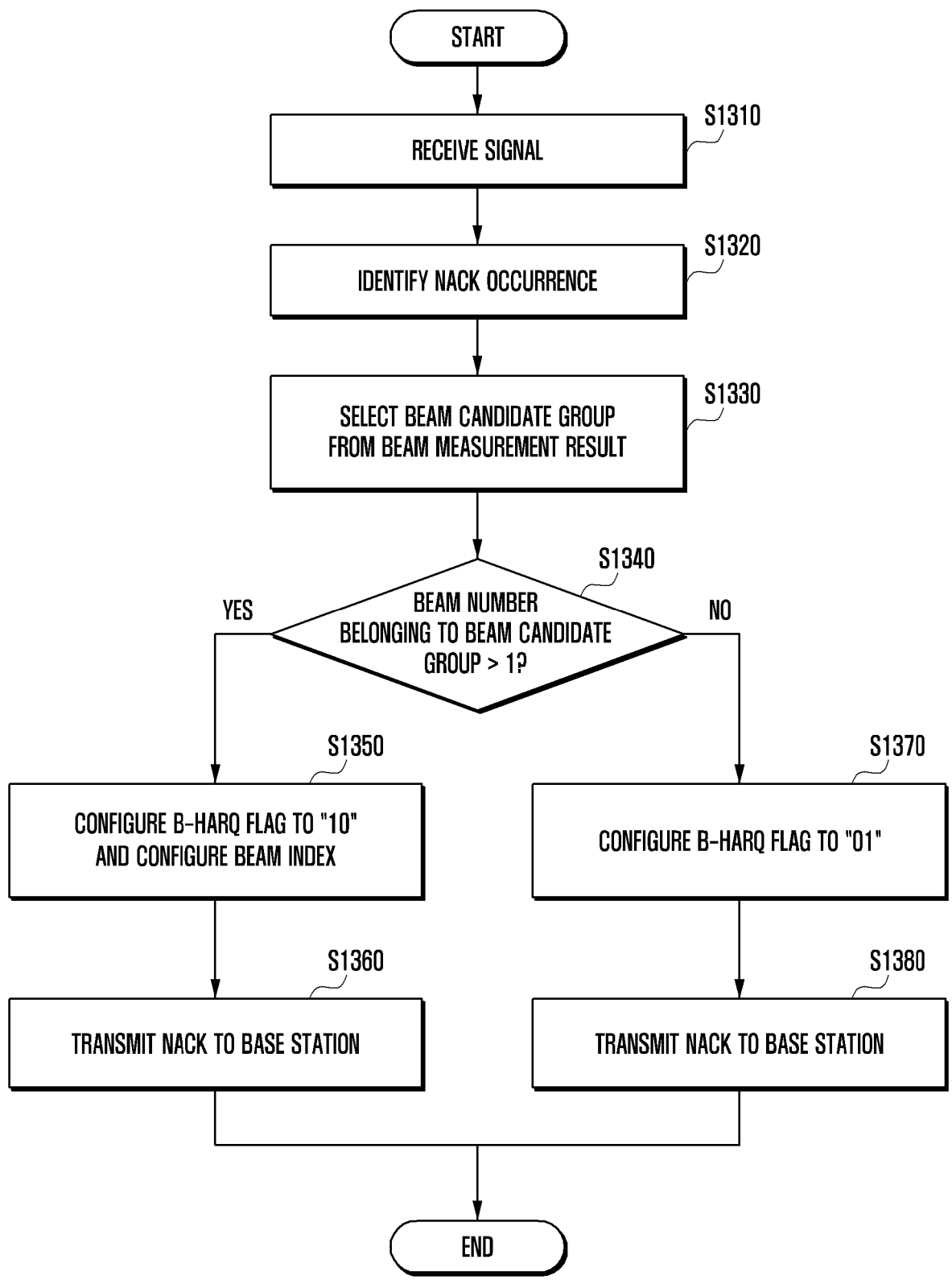
FIG. 13 is a flowchart explaining an operation of a terminal in a retransmission process to which beam diversity is applied according to another proposed embodiment.
Figure 14:
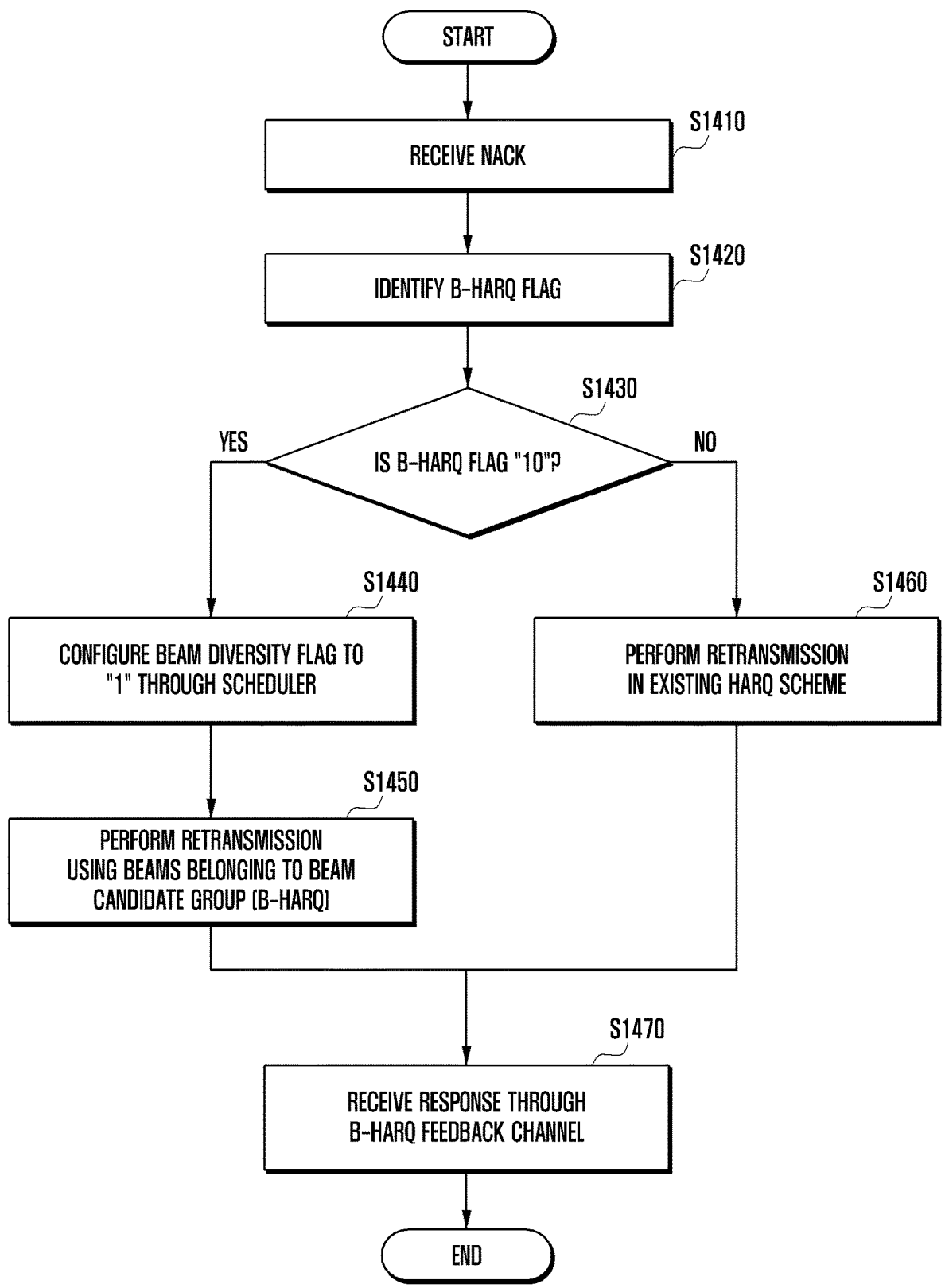
FIG. 14 is a flowchart explaining an operation of a base station in a retransmission process to which beam diversity is applied according to another proposed embodiment.

FIGS. 13 and 14 are flowcharts explaining operations of a terminal and a base station in a retransmission process to which beam diversity is applied according to another proposed embodiment. With reference to FIGS. 13 and 14, a detailed embodiment in which the above-described explicit method is applied when the beam diversity is applied in a retransmission process will be described.

In FIG. 13, the terminal receives a signal from the base station (S1310), and it identifies NACK occurrence in a process of decoding a data packet included in the received signal (S1320). The terminal may select a beam candidate group from the beam measurement result (S1330) prior to NACK transmission, and the beam candidate group may include one or more beam combinations in which the beam gain is calculated to be equal to or higher than a threshold value in the beam measurement process.

Although FIG. 13 illustrates that operation S1330 for selecting the beam candidate group is performed after the NACK occurrence is identified, it may also be performed in the beam measurement process prior to operation S1310. If the beam candidate group is selected prior to operation S1310, the terminal performs operation S1340 after identifying the NACK occurrence.

At operation S1340, the terminal identifies the number of beam combinations belonging to the selected beam candidate group. If the number of beam combinations belonging to the beam candidate group exceeds "1", that is if a plurality of beam combinations are included in the beam candidate group, the terminal configures the above-described beam HARQ (B-HARQ) flag to "10". Further, the terminal configures a beam index for each of the plurality of beam combinations belonging to the beam candidate group (S1350). The beam index and the B-HARQ flag will be described in detail through FIGS. 17 to 19. Meanwhile, if a single beam combination is included in the beam candidate group, but the beam combination is different from the previous beam combination, the B-HARQ flag may be configured to "10". That is, if the beam combination belonging to the beam candidate group is a beam combination that is different from that of the initial transmission or a plurality of beam combinations belong to the beam candidate group, and thus it is possible to obtain the diversity gain through the beam diversity, the terminal may configure the B-HARQ flag to a specific value.

At operation S1360, the terminal transmits the B-HARQ flag and the beam index to the base station. That is, the terminal notifies the base station of the NACK occurrence by configuring the B-HARQ flag to a specific value, and it may request the base station to perform retransmission through one or more beam combinations at the same time. That is, the B-HARQ flag may indicate the HARQ (i.e., B-HARQ) procedure for retransmission to which the beam diversity is additionally applied in addition to simple NACK information. In other words, the terminal transmits, to the base station, the NACK notifying that an error occurs in the data packet and the retransmission is required, information (B-HARQ flag) for requesting to retransmit the corresponding packet through a plurality of beam combinations (or beam combination that is different from that of the initial transmission), and information (beam indexes) on the plurality of beam combinations to be used for the retransmission.

Meanwhile, if the number of beam combinations belonging to the beam candidate group is equal to or smaller than "1", this means that the number of beam combinations that satisfy the beam gain that is equal to or higher than a threshold value is equal to or smaller than "1". In this case, even if the data packet is transmitted through different beam combinations, the beam gain is not sufficient, and thus it is difficult to obtain the beam diversity. Accordingly, the terminal configures the B-HARQ flag to "01" (S1370), and configuration of the B-HARQ flag to "01" may mean a retransmission request (i.e., NACK) in accordance with the HARQ procedure in the related art. The terminal may transmit the B-HARQ flag that is configured to "01" to the base station (S1380). However, if the beam combination is a beam that is different from that of the initial transmission of the data as described above, the initially transmitted data and the retransmitted data pass through different beam paths, and thus the diversity gain can be obtained. In this case, even if one beam combination constitutes the beam candidate group, the diversity gain can be obtained. Accordingly, in this case, even if one beam combination constitutes the beam candidate group, the terminal may configure the B-HARQ flag to "10".

Meanwhile, in contrast with the embodiment as described above with reference to FIG. 11, if the information on the beam candidate group selected at operation S1330 has already been shared with the base station, the terminal, at operations S1350 and S1360, may configure the B-HARQ flag to "10" to be transmitted, but it may not transmit the beam index. This is because information on the beam candidate group having the beam gain that is equal to or higher than the threshold value has already been known to the base station.

Further, even if the information for a specific beam candidate group has already been known to the base station at operation S1330, the terminal may newly select other beam combinations for maximizing the diversity gain for the retransmission at the present time. In this case, even if the terminal has already reported the information on the beam candidate group to the base station, it is required for the terminal to notify the base station of the newly selected beam candidate group while configuring the B-HARQ flag to "10", and thus the terminal may transmit the information on the beam index to the base station together with the NACK.

Then, an operation process of a base station will be described through FIG. 14. In FIG. 14, the base station receives the NACK from the terminal (S1410), and it identifies that retransmission of a specific data packet is necessary. Meanwhile, the base station receives the B-HARQ flag from the terminal, and it identifies the B-HARQ flag value for requesting the retransmission (S1420). As described above, if the B-HARQ flag value is configured to "10", it may mean the B-HARQ procedure in which the beam diversity is applied through a plurality of beams and the retransmission is performed, whereas if the B-HARQ flag value is configured to "01", it may mean a single beam retransmission procedure that is equal to or similar to the HARQ procedure in the related art. The detailed configuration example of the B-HARQ flag value will be described again with reference to FIGS. 17 to 19.

The base station identifies the B-HARQ flag value, and if the B-HARQ flag value is "10" (S1430), the base station determines to apply the beam diversity through a plurality of beams and to retransmit the data. In this case, according to an embodiment, a scheduler of the base station configures the beam diversity flag to "1" (S1440), and it performs retransmission in accordance with the B-HARQ procedure using a plurality of beams belonging to the beam candidate group (S1450). The plurality of beams belonging to the beam candidate group for the retransmission may be indicated by the beam index received together with the B-HARQ flag value at operation S1410, and they may be indicated by the beam candidate group information received when the beam measurement result is reported from the terminal separately from the NACK (i.e., B-HARQ flag).

Meanwhile, the above-described scheduler may means an entity included in the base station to manage the scheduling, and it may be an independent entity implemented separately from the base station.

If the base station identifies the B-HARQ flag value, and if the flag value is "01" (S1430), the base station determines to perform retransmission through a single beam. That is, the base station may retransmit a packet in accordance with the existing HARQ scheme (S1460). Meanwhile, even if the base station performs the retransmission through the single beam, a beam combination that is different from the initial transmission may be used for the retransmission, and in this case, even if the retransmission is performed through the single beam, the receiving side can obtain the diversity gain due to the retransmission.

The base station having performed the retransmission at operation S1450 or S1460 receives a response to whether the data packet retransmitted from the terminal has been successfully received through a B-HARQ feedback channel, and it performs the retransmission procedure (S1470). That is, if the NACK occurs even with respect to the packet retransmitted in accordance with the B-HARQ procedure, the base station may iteratively transmit the data packet up to the maximum number of times of retransmission through the plurality of beams. In this case, the base station may change the beam combination whenever the transmission is iteratively performed to maximize the beam diversity gain. Further, if the ACK occurs with respect to the packet retransmitted in accordance with the B-HARQ procedure, the base station may initially transmit new data to the terminal.

Meanwhile, the terminal having received the data packet retransmitted through one or more beam combinations in accordance with the B-HARQ procedure of the proposed embodiment may perform transmission passing through a plurality of different channels, and thus it can receive a signal that is strong against the error occurrence. Accordingly, the terminal may obtain the diversity gain from the received signals, and it may successively perform decoding through combination of the received data packets.

Figure 15:
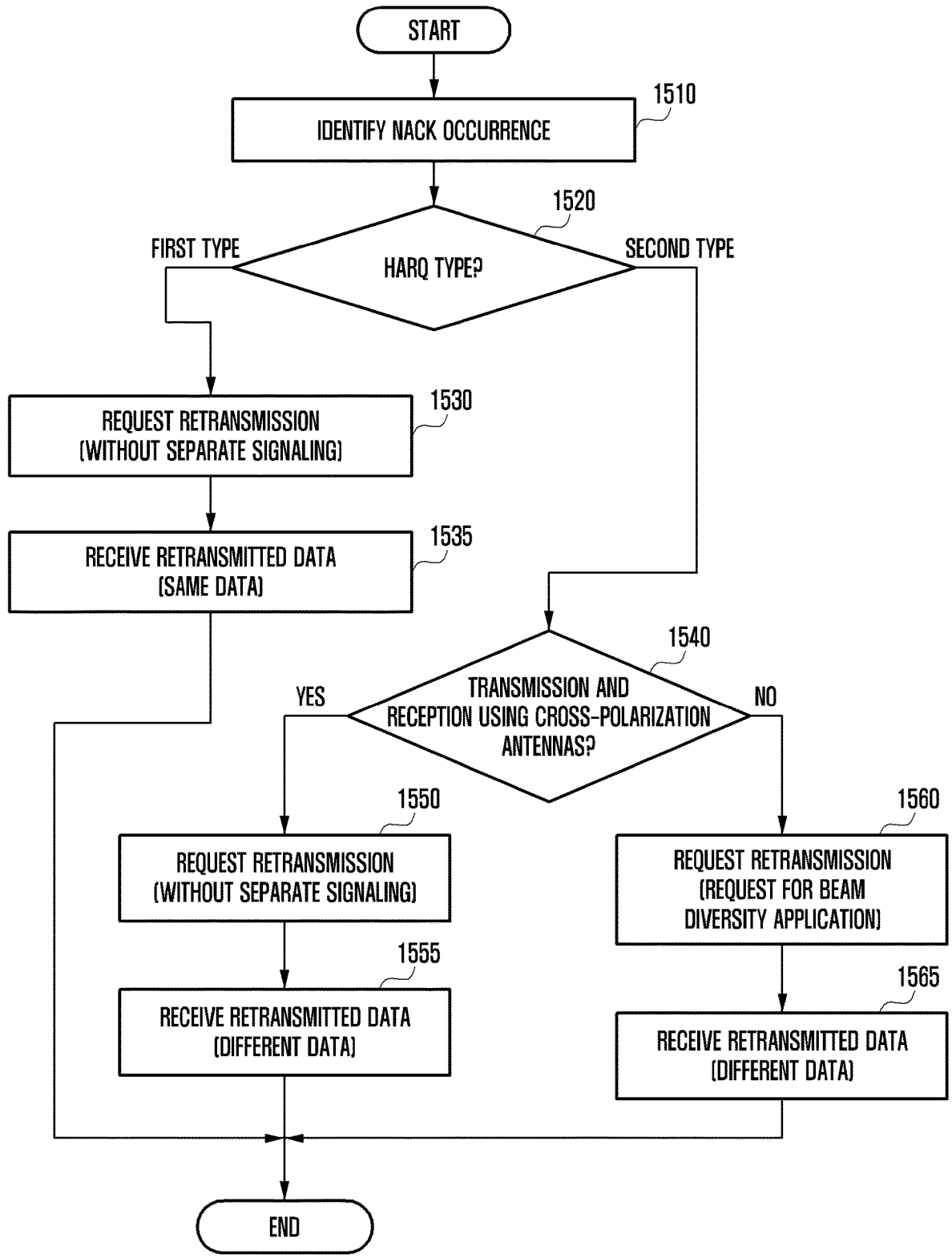
FIG. 15 is a flowchart explaining an operation of a terminal in a retransmission process to which beam diversity is applied according to still another proposed embodiment.
Figure 16:
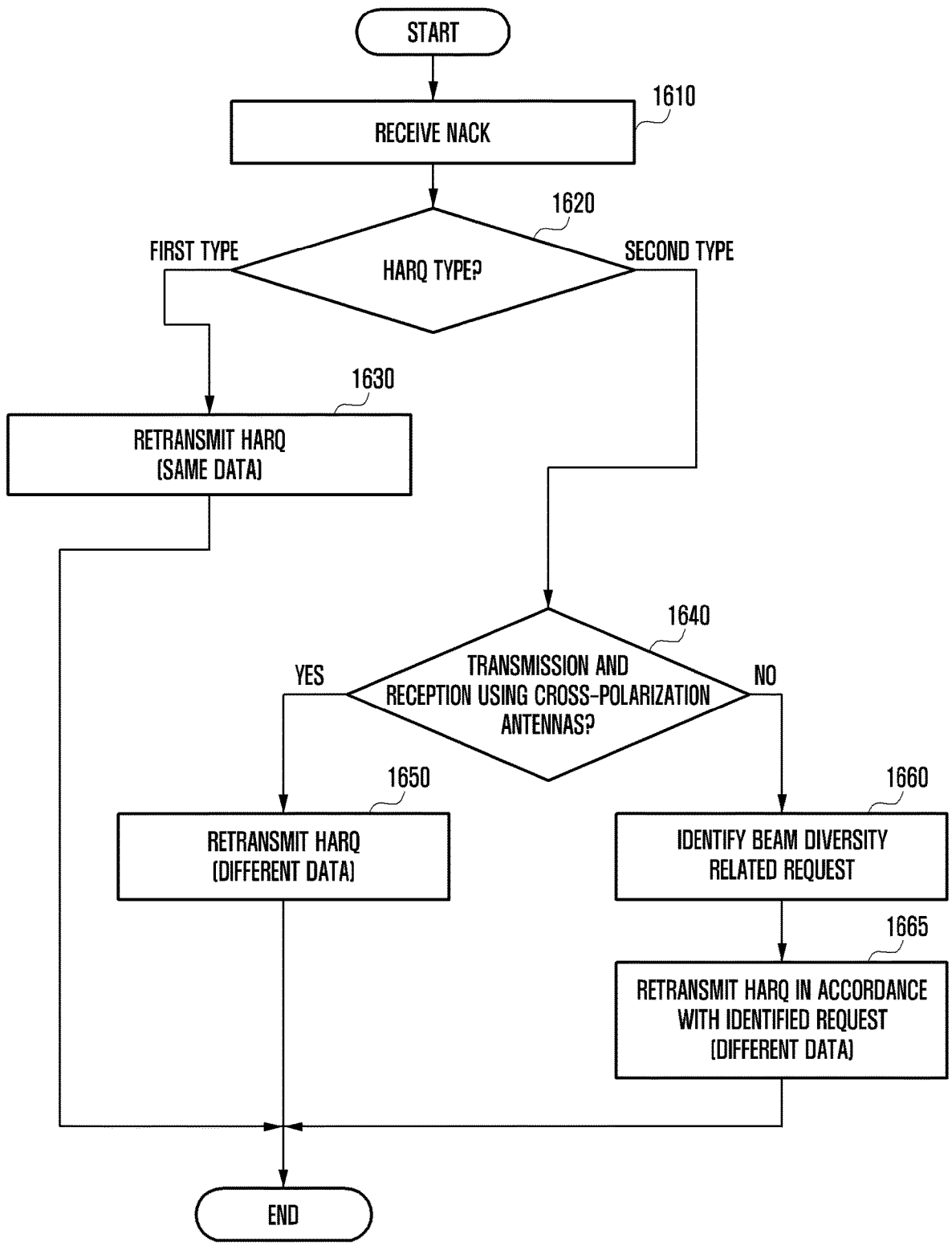
FIG. 16 is a flowchart explaining an operation of a base station in a retransmission process to which beam diversity is applied according to still another proposed embodiment.

FIGS. 15 and 16 are flowcharts explaining operations of a terminal and a base station in a retransmission process to which beam diversity is applied according to still another proposed embodiment. With reference to FIGS. 15 and 16, how the above-described embodiment is applied in accordance with the different HARQ retransmission schemes when the HARQ retransmission procedure to which the beam diversity is applied is performed.

In the HARQ retransmission procedure, there exist a chase combining (CC) scheme for transmitting data that is equal to that of initial transmission during the retransmission and an incremental redundancy (IR) scheme for transmitting data that is different from that of the initial transmission during the retransmission. According to the CC scheme (hereinafter first type retransmission), the data that the base station retransmits to the terminal after receiving the NACK is equal to the initially transmitted data. That is, in the CC scheme, the initially transmitted data packet and the retransmitted data packet are equal to each other.

In contrast, according to the IR scheme (hereinafter, second type retransmission), the data that the base station retransmits to the terminal after receiving the NACK is different from the initially transmitted data, and the retransmitted packet is added with a redundancy information block. That is, in the IR scheme, an original packet is transmitted during the initial transmission, and the packet added with the encoded redundancy information is transmitted during the retransmission.

In the above-described CC (first type retransmission) scheme and the IR (second type retransmission) scheme, embodiments as described above with reference to FIGS. 2 to 14 may be applied, and hereinafter, a terminal operation will be described with reference to FIG. 15.

First, with reference to FIG. 15, the terminal identifies NACK occurrence with respect to the initially transmitted data (1510). Then, the terminal identifies a preconfigured HARQ type prior to request retransmission from the base station (1520). As described above, although the HARQ type may be any one of the CC scheme (first type) and the IR scheme (second type), it may not be limited thereto, and various retransmission schemes defined in the communication system in which the terminal and the base station operate may be applied in all. For example, the proposed embodiment can be applied even to the retransmission scheme in which redundancy version (RV) values are circulated and applied every retransmission time.

If the HARQ type configured to the terminal is the first type, the terminal requests retransmission from the base station (1530). As described above, in the first type retransmission, the initially transmitted data and the retransmitted data are equal to each other. Accordingly, in the case of the first type retransmission, the terminal may not additionally transmit a separate signaling to the base station, but it may request only the data retransmission through the NACK signal. In other words, the terminal does not request the retransmission using one or more beams, such as the B-HARQ flag as described above with reference to FIG. 13, but it may simply transmit only the NACK signal to the base station. As described above, it may be understood as the meaning of an implicit method as described above with reference to FIG. 7 that the terminal does not transmit the separate signaling or request to the base station.

Meanwhile, because a process of determining a beam candidate group through beam measurement between the terminal and the base station separately from requesting the retransmission using one or more beams through the terminal is to be performed periodically or aperiodically, the base station may retransmit the same data to the terminal using two or more beams selected from the beam candidate group if the NACK signal is received from the terminal. The terminal receives the data retransmitted from the base station in accordance with the NACK signal (1535), and the received data becomes data that is equal to the initially transmitted data.

In contrast, if the HARQ type configured to the terminal is the second type, the terminal may identify information on antenna configuration prior to the retransmission request from the base station (1540). Specifically, it may be preconfigured that the base station and the terminal include the above-described cross-polarization antennas and they use the cross-polarization antennas for their mutual communication. The signal due to the horizontal polarization and the signal due to the vertical polarization of the cross-polarization antennas establish orthogonality to exert no interference between them. Accordingly, if the transmission/reception using the cross-polarization antennas is possible even in the case where the initially transmitted data and the retransmitted data are different second type retransmissions, the terminal does not separately request the retransmission using one or more beams, but it requests only the retransmission through the NACK signal to cause no interference, and thus the terminal can normally perform the decoding. Accordingly, if the transmission/reception using the cross-polarization antennas is configured (1540), the terminal may transmit only the NACK signal for requesting the retransmission to the base station without separate signaling for the beam diversity (1550). This scheme may be understood as a meaning, such as the implicit method as described above with reference to FIG. 8. Then, the terminal receives the retransmitted data transmitted from the base station (1555), and the retransmitted data becomes a data packet that is different from the initially transmitted data in accordance with the second type retransmission. Further, the retransmitted data may be received in the terminal through the beam having the polarization that is different from that of the beam used for the initial transmission among signals by the cross-polarization antennas.

Meanwhile, if the HARQ type configured to the terminal is the second type and the transmission/reception using the cross-polarization antennas is not configured (1540), the terminal may request beam diversity application while transmitting the NACK signal for requesting the retransmission to the base station (1560). This is because the data that is retransmitted in the IR scheme is at least partly different from the initially transmitted data, and in order to accurately receive the retransmitted data packet, it is required for the terminal to know what beam is to be used. According to the embodiments as described above with reference to FIGS. 10 to 14, the terminal transmits the NACK, and it transmits information notifying that the beam diversity is to be applied using one or more beams to the base station. For example, the terminal configures the B-HARQ flag to a specific value to transmit the B-HARQ flag to the base station together with the NACK signal, or the terminal may transmit information on the beam index to be used for the retransmission to the base station together with the NACK signal. Then, the terminal receives the retransmitted data (1565), and the retransmitted data is different from the initially transmitted data, and it may be data that is transmitted through the beams selected from the beam candidate group based on information on the beam index reported by the terminal together with the NACK. Further, the retransmitted data is transmitted using one or more beams, and thus the terminal that is the receiving end can obtain the beam diversity.

Then, with reference to FIG. 16, the base station receives the NACK for the initially transmitted data from the terminal (1610), and it identifies the HARQ retransmission scheme predetermined between the base station and the terminal (1620).

If the configured HARQ retransmission scheme is the first type retransmission (or CC scheme) as described above, the base station transmits data that is equal to the initially transmitted data to the terminal in accordance with the NACK signal received from the terminal (1630). In this case, even if the terminal does not perform separate signaling, the base station may transmit the retransmitted data to the terminal using one or more beams selected from the beam measurement result pre-received from the terminal (i.e., implicit method).

Meanwhile, if the configured HARQ retransmission scheme is the second type retransmission (or IR scheme), the base station determines whether transmission/reception using the cross-polarization antennas is configured to the terminal (1640). As described above, if the terminal and the base station include cross-polarization antennas, and they are configured to be able to perform the transmission/reception using the cross-polarization antennas, it is possible to generate and transmit orthogonal signals. If the transmission/reception using the cross-polarization antennas is possible, the base station transmits the retransmitted data that is different from the initially transmitted data (1650), and the retransmitted data becomes a data packet that is different from the initially transmitted data in accordance with the second type retransmission. Further, the base station may transmit the retransmitted data to the terminal through the generated signal using the polarization that is different from the polarization used for the initial transmission among the signals by the cross-polarization antennas.

In contrast, if the transmission/reception using the cross-polarization antennas is not configured (1640), the base station identifies a beam diversity related request included in the NACK signal received from the terminal (1660) (i.e., explicit method). Such a beam diversity related request may include at least one of a process of identifying the B-HARQ flag as described with reference to FIGS. 13 and 14 and a process of identifying the beam index value received together with the NACK signal. Then, the base station transmits the retransmitted data to the terminal using the selected beam in accordance with the identified request (1665).

As described above with reference to FIGS. 15 and 16, the terminal and the base station may send and receive the retransmitted data in various manners in accordance with the HARQ retransmission scheme configured between them and the antenna configuration and settings. Based on the HARQ retransmission scheme and the antenna configuration and settings, the base station may transmit the retransmitted data to which the beam diversity is applied using one or more beams even if the terminal does not explicitly request the retransmission to which the beam diversity is applied. Further, the base station may identify the beam diversity related information or request explicitly transmitted by the terminal, and it may transmit the retransmitted data to which the beam diversity is applied to the terminal in accordance with the identified information. In any scheme, the base station may transmit the data related to each other to the terminal through the plurality of beams during the retransmission, and thus it can make it possible to improve the decoding performance through obtaining of the beam diversity gain from the data received by the terminal through the plurality of beams.

Figure 17:
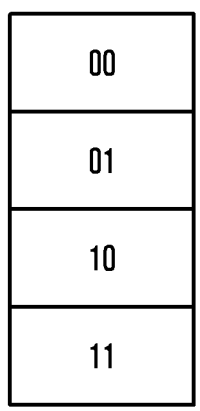
FIG. 17 is a diagram illustrating a flag configuration example according to a proposed embodiment.
Figure 18:
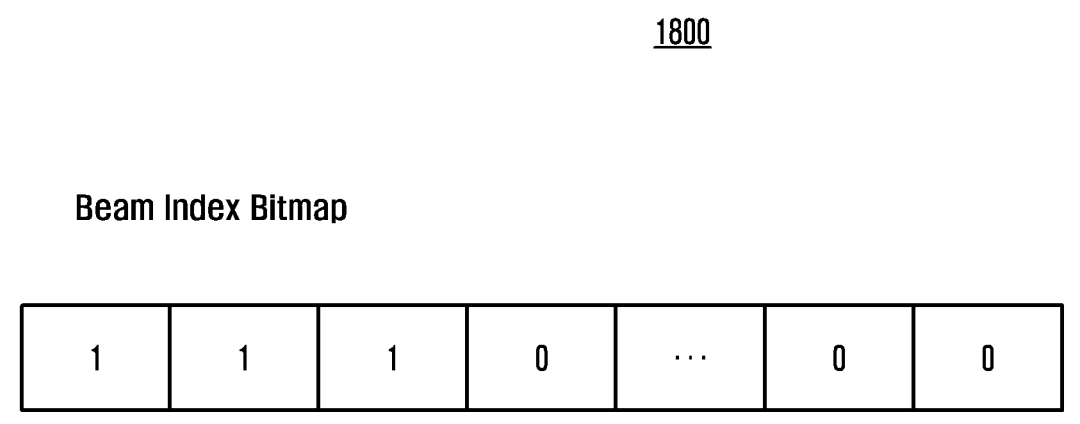
Figure 19:
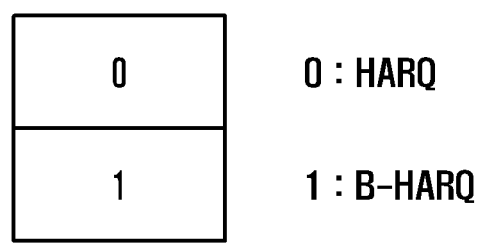
FIG. 19 is a diagram illustrating a flag configuration example according to a proposed embodiment.

With reference to FIGS. 17 to 19, a flag, an index, and a bitmap related to a retransmission procedure to which the beam diversity is applied will be described in detail.

First, FIG. 17 is a diagram illustrating a flag configuration example according to a proposed embodiment. As in the above-described embodiment, the terminal transmits a B-HARQ flag to the base station as a response indicating whether a data packet is normally received. The B-HARQ flag may be applied to the above-described explicit method.

Figure 5:
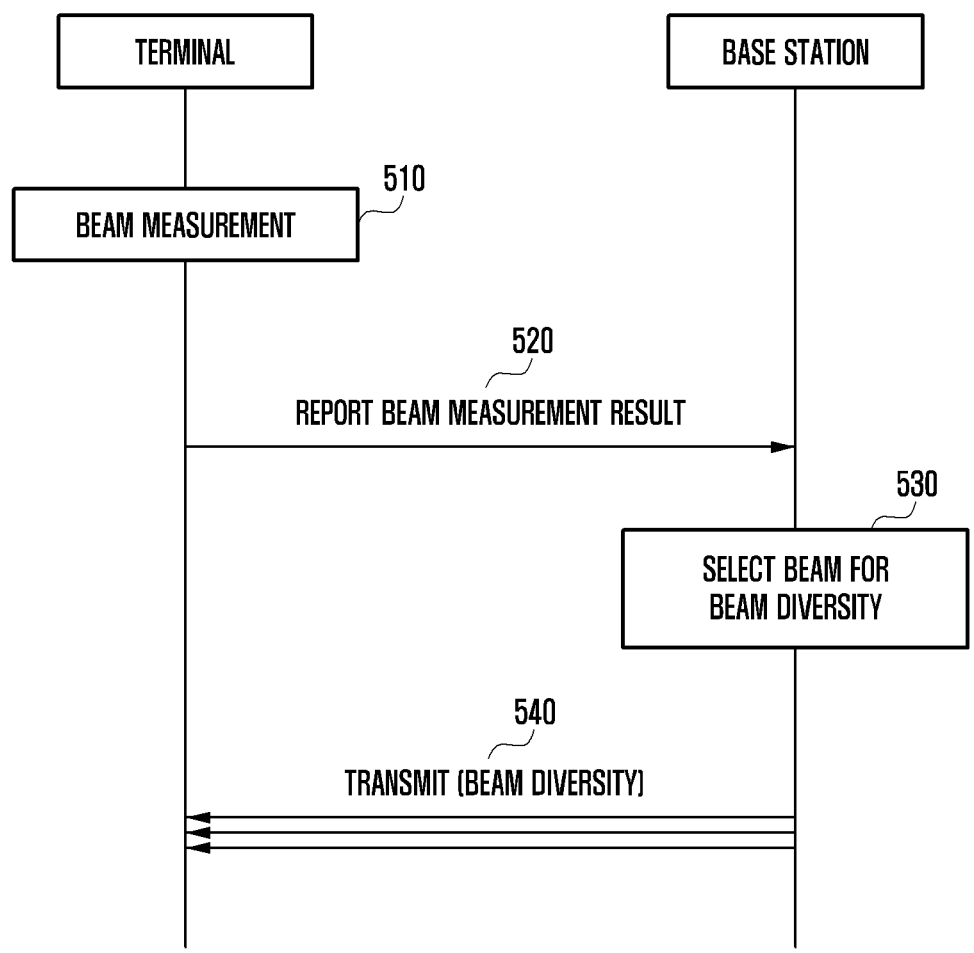
FIG. 5 is a flowchart explaining a transmission process to which beam diversity is applied according to a proposed embodiment.

In this case, the B-HARQ flag may be composed of 2 bits (1700), and the 2-bit B-HARQ flag may be configured as illustrated in FIG. 5. For example, the flag value "00" means ACK, "01" means that NACK is generated and retransmission in accordance with the HARQ procedure in the related art is requested, "10" may mean that NACK is generated and retransmission in accordance with the B-HARQ procedure according to the above-described embodiment is requested, and "11" may be reserved bits.

On the other hand, the flag configuration illustrated in FIG. 17 is merely exemplary, and the meaning of the respective B-HARQ flag values may differ without limit in accordance with the implementation examples. Further, although FIG. 17 illustrates an example in which the B-HARQ flag is composed of 2 bits, the B-HARQ flag is not limited thereto, and it may be composed of more bits or less bits.

FIG. 18 is a diagram illustrating a bitmap configuration example according to a proposed embodiment. According to the above-described embodiment, the terminal may report a beam index indicating a beam candidate group to the base station together with a B-HARQ flag.

As illustrated in FIG. 18, the beam index may be composed of a bitmap (1800). If the beam index is composed of the bitmap, a plurality of bits constituting the bitmap may correspond to different beam combinations. For example, if 8 beam combinations are generated through the reception beam of the terminal and the transmission beam of the base station, the bitmap indicating the beam index may be composed of 8 bits.

In this case, if the bit value in the bitmap is "1", it means that the corresponding beam combination is selected as a beam candidate group, and if the bit value is "0", it means that the corresponding beam combination is not selected as the beam candidate group. For example, if the beam index bitmap is configured to "11100000" and it is transmitted to the base station, the base station can know that the beam combination corresponding to first three bits is selected as the beam candidate group, and in this case, the base station may retransmit a data packet using the corresponding three beam combinations. Of course, the beam index or the bit value of the bitmap may be oppositely configured.

Meanwhile, the beam index may be composed of not only the bitmap as illustrated in FIG. 18 but also an identifier indicating the beams included in the beam candidate group. For example, in an embodiment of FIG. 5, the beam index may be composed of a successive array of values (or identifiers) indicating three beam combinations (0,0), (1,1), and (2,2). In the case of the bitmap, as the number of beam combinations that may occur is increased, a larger number of bits are required, and if the number of the beam combinations is large, direct indication of a specific beam combination may be advantageous as described above.

Meanwhile, the beam index explained in FIG. 18 may be pre-reported to the base station in accordance with the beam measurement process, and in this case, the terminal may transmit the beam index to the base station separately from the NACK. Further, if a beam candidate group that is different from the reported beam candidate group is selected although the terminal previously reported the beam index to the base station, the terminal may transmit the beam index corresponding to a new beam candidate group to the base station together with the NACK.

FIG. 19 is a diagram illustrating a flag configuration example according to an embodiment of the disclosure. The beam diversity flag includes information for the base station having received the B-HARQ flag (with NACK) to notify the terminal in what procedure the retransmission is performed in what procedure. As illustrated in FIG. 19, if the beam diversity flag is composed of 1 bit (1900), the value "0" means that the retransmission is performed in accordance with the HARQ procedure in the related art, and the value "1" means that the B-HARQ retransmission to which the beam diversity is applied through a plurality of beams included in the beam candidate group is performed according to the proposed embodiment. Of course, the meaning corresponding to two values may be configured opposite to that as exemplarily illustrated in the drawing.

The terminal having received the beam diversity flag transmitted by the base station may know in what retransmission procedure, the base station has determined to transmit the data packet. That is, the terminal may know from the beam diversity flag whether the base station is to perform the reception in accordance with the HARQ procedure in the related art or to perform the retransmission through the plurality of beams in accordance with the B-HARQ retransmission procedure, and the terminal may determine whether to receive the retransmitted data packet through a single beam combination in accordance with the HARQ procedure or to receive the data packet through a plurality of beam combinations (or beam combination that is different from that of the initial transmission) in accordance with the B-HARQ retransmission procedure.

For example, if the beam diversity flag indicates the retransmission in accordance with the HARQ procedure, the terminal receives the data retransmitted through the beam through which the data has been received. This means that the base station can perform retransmission in accordance with the HARQ procedure in the related art even if the terminal has requested to perform the retransmission through the beam candidate group by transmitting the B-HARQ flag as a NACK response. That is, a case where the base station is unable to use the plurality of beams in accordance with the scheduling situation in spite of the terminal request may occur, and in this case, the base station may notify the terminal that the retransmission is performed in accordance with the HARQ procedure in the related art through the beam diversity flag.

In contrast, if the beam diversity flag indicates the retransmission in accordance with the B-HARQ procedure, the terminal receives the data packet retransmitted through the plurality of beams corresponding to the beam index that the terminal has transmitted to the base station together with the NACK. In this case, the base station may retransmit the data using all the beam combinations that the terminal has requested through the beam index information, or it may retransmit the data using only a partial beam combination in accordance with the scheduling environment or network situation.

Figure 20:
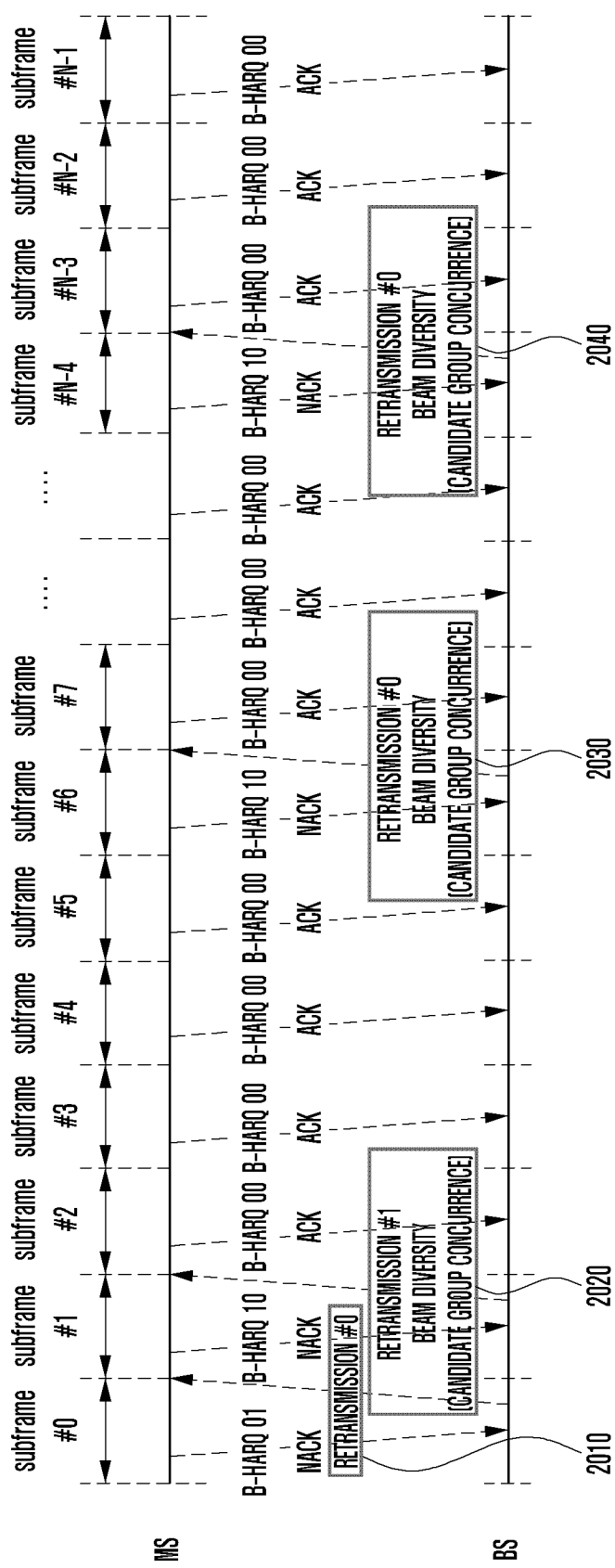
FIG. 20 is a flowchart explaining a retransmission process to which beam diversity is applied according to another proposed embodiment.
Figure 21:
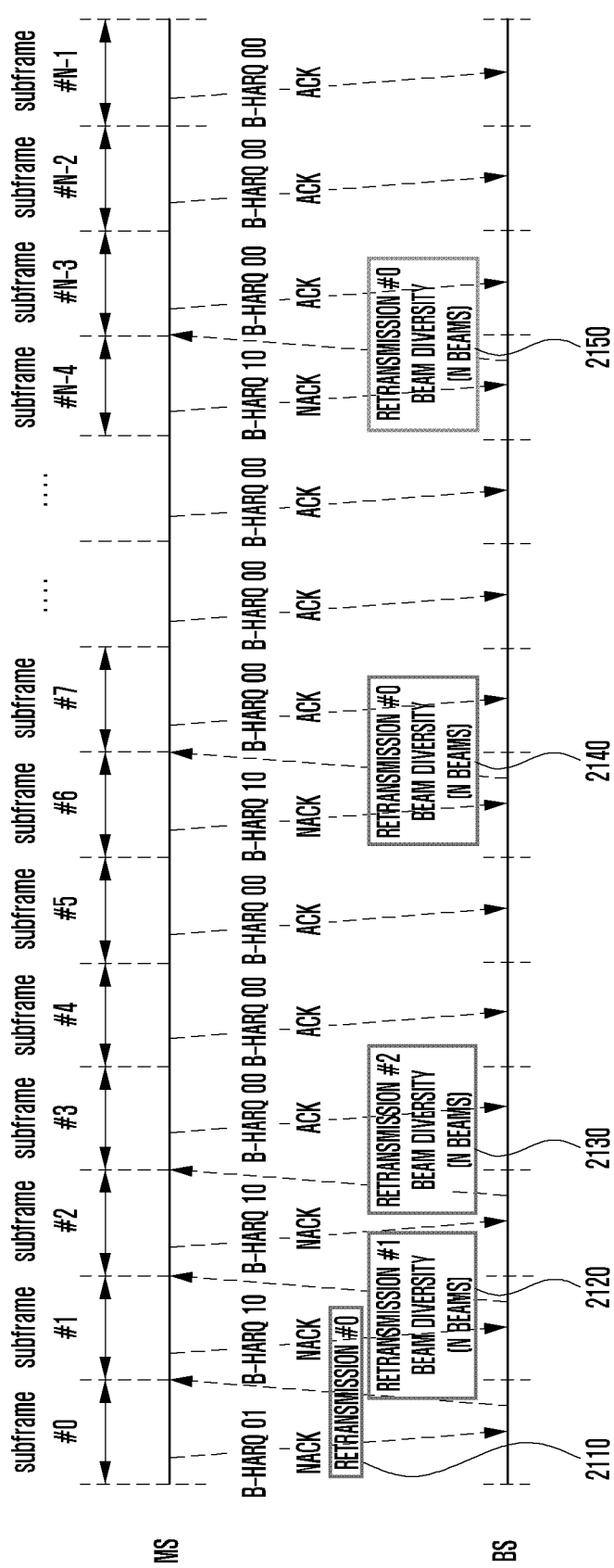
FIG. 21 is a flowchart explaining a retransmission process to which beam diversity is applied according to still another proposed embodiment.

FIGS. 20 and 21 are flowcharts explaining a retransmission process to which beam diversity is applied according to another proposed embodiment. With reference to FIGS. 20 and 21, a retransmission procedure to which beam diversity of the terminal and the base station is applied according to the above-described embodiment will be described in accordance with a time flow.

First, in subframe #0 of FIG. 20, the terminal recognizes that an error has occurred in decoding the received data packet, and it transmits NACK to the base station. The terminal configures the B-HARQ flag to "01" to be transmitted to the base station, and "01" of the B-HARQ flag may mean that the retransmission (i.e., NACK) in accordance with the HARQ procedure in the related art is requested as described above with reference to FIG. 17. The base station having received the B-HARQ flag "01" as the NACK retransmits the data (2010), and the base station may perform the retransmission in accordance with the HARQ procedure in the related art.

Then, if an error still occurs even with respect to the data packet retransmitted by the base station, the terminal transmits again the NACK to the base station in subframe #1. In this case, the terminal transmits the B-HARQ flag "10" to the base station to request the retransmission from the base station. According to an example as described above with reference to FIG. 17, the B-HARQ flag value "10" may mean that the retransmission to which the beam diversity is applied is requested (i.e., NACK) using the plurality of beams belonging to the beam candidate group. As described above, the terminal can notify the base station of the beams belonging to the selected beam candidate group by transmitting information on the beam index to the base station together with the B-HARW flag value "10".

The base station having received the B-HARQ flag "10" together with the NACK retransmits the data simultaneously using the plurality of beam combinations of the beam candidate group pre-reported or reported together with the NACK (2020). The terminal having successfully received the retransmitted data configures the B-HARQ flag to "00" to be transmitted in order to notify the ACK in subframe #2. As described above, in the case of using the plurality of beams in the retransmission process, the beam diversity is secured, and thus stable communication performance can be guaranteed.

Meanwhile, in subframe #6, the terminal may transmit the NACK again to the base station, and in this case, it may configure the B-HARQ flag value to "10". That is, in subframe #0 and #1, the terminal has requested the retransmission in accordance with the B-HARQ procedure if the NACK is generated again after the retransmission in accordance with the HARQ procedure in the related art. However, the terminal may immediately request the retransmission in accordance with the B-HARQ procedure when the retransmission is requested as in an embodiment of subframe #6. The base station having received the B-HARQ flag value "10" retransmits the data using all the plurality of beams constituting the base candidate group (2030). Such an embodiment may be applied even with respect to the retransmission process in subframe N−4 in the same/similar manner (2040).

In contrast with the embodiment illustrated in FIG. 20, according to another embodiment of the disclosure, if the NACK is continually generated as many as a specific number of times after the retransmission in accordance with the HARQ procedure, the terminal may request the retransmission to which the beam diversity is applied in accordance with the B-HARQ procedure. In other words, if the NACK is generated once after the retransmission in accordance with the HARQ procedure as in the case of subframe #0 and #1 of FIG. 20, the terminal may request the retransmission to which the beam diversity in accordance with the B-HARQ procedure is applied, and if the NACK is continually generated twice or more, the terminal may request the retransmission to which the beam diversity is applied in accordance with the B-HARQ procedure.

FIG. 21 is a diagram illustrating a retransmission process according to an embodiment of the disclosure. With reference to FIG. 21, a retransmission procedure to which beam diversity according to another embodiment that is different from the embodiment as previously described is applied.

In subframe #0, the terminal transmits NACK by configuring the B-HARQ flag to "01", and the base station performs retransmission in accordance with the HARQ procedure in the related art (2110). If an error still occurs even with respect to the retransmitted data packet, the terminal transmits the NACK by configuring the B-HARQ flag to "10", and in this case, the terminal transmits beam index for indicating the beams selected from the beam candidate group together. Then, base station performs the retransmission to which the beam diversity is applied using the plurality of beams in accordance with the B-HARQ procedure (2120), and in this case, the beams used for the retransmission may be N partial beams selected from the beam candidate group. That is, if the beams of the beam candidate group are unable to be used in all due to the scheduler situation or the network situation, the base station may perform the retransmission to which the beam diversity is applied in accordance with the B-HARQ procedure using the partial beams.

Then, if an error occurs in spite of the first retransmission (2120) in accordance with the B-HARQ procedure, the terminal configures the B-HARQ flag to "10" again, and it reports the B-HARQ flag to the base station. The base station performs the second retransmission using the plurality of beams in accordance with the B-HARQ procedure (2130), and in this case, the beams used for the retransmission may be N partial beams selected from the beam candidate group. Meanwhile, the beams used in the second retransmission (2130) may be equal to the beams used in the first retransmission (2110) or it may be different from the beams used in the first retransmission (2110), or the number of beams used for the retransmission may differ.

For example, there may be a case where 4 beam combinations are included in the beam candidate group to be reported, and the base station perform the retransmission using 2 of 4 beam combinations in the first retransmission (2120). Then, the base station selects 2 of 4 beam combinations of the beam candidate group in the second retransmission (2130), and the selected 2 beam combinations may be equal to 2 beam combinations selected in the first retransmission (2120) partly or wholly, or 2 non-selected beam combinations may be selected. Further, in the second retransmission (2130), 3 or 4 beam combinations may be selected, or one beam combination that is smaller than the beam combination in the first retransmission may be selected.

Even if the base station performs the retransmission using the beam combination that is different from the number of beam combinations requested by the terminal and/or the beam index, the terminal is merely unable to receive the data through the reception beams monitored by the terminal itself, and thus no error occurs in decoding.

Then, if the NACK is generated even in subframe #6 and N−4, the terminal may configure the B-HARQ flag to "10" to be reported to the base station, and the base station performs the retransmission by selecting certain N beams indicated by the terminal through the beam index from the beam candidate group (2140 and 2150).

Hereinafter, an embodiment in which the base station selects N beams from the beam candidate group will be described in more detail. The base station selects N beams in consideration of at least one of the beam measurement result received from the terminal, BRSRP from the beam candidate group, beam direction, or the maximum number of times of retransmission. The maximum number of selected N beams may be the maximum number of transmission beams of the base station and may be a value that does not exceed the maximum number of reception beams at the same time. Further, the base station may select the beam combination capable of maximizing the beam diversity among the beam combinations included in the beam candidate group.

On the other hand, as the number N of beams selected by the base station is increased, the transmission power of the base station should be divided for each beam, and thus a problem may occur in the power allocation. Within the limit permitted by the transmission power of the base station, N beams may be selected in a direction in which the diversity gain is maximized.

Further, according to an embodiment, in a process of selecting a plurality of beams, the base station may select the beams so that a physical distance between the beam combinations becomes the farthest. This is because the diversity gain can be maximized as the physical distance of the signal transmitted through a space becomes far. The physical distance between the beam combinations may mean the degree of separation of paths in which the transmission beam of the base station and the reception beam of the terminal are formed in a channel space between the base station and the terminal. This process may be understood that the base station considers the relation between data to be transmitted through the plurality of beams when selecting the plurality of beams. That is, because the relation between the data may be low in the case where the path selects a distant beam rather than selecting a close beam, the redundancy information gain obtained by the terminal can be maximized even if the same data packet is transmitted. In other words, the process of selecting the plurality of beams used for the signal transmission may be used as a means for transferring the redundancy information to the terminal.

The base station may maximize the diversity gain by dividing and allocating the transmission power to N selected transmission beams. For example, the base station may allocate the transmission power to the respective beams so that the capacity is maximized or a block error ratio (BLER) is minimized.

According to the above-described embodiments, it is possible to transmit the signal by applying the beam diversity in the communication system to which the beamforming is applied. According to the embodiments of the disclosure, the probability of transmission failure can be reduced even in a frequent radio wave blocking situation in the communication system to which the beamforming is applied, and thus the probability that a decoding error of a received signal occurs in the receiving end can be reduced. Accordingly, the probability that the receiving end requests retransmission is reduced, and thus a situation in which unnecessary retransmission is performed can be prevented from occurring. Further, even in the case where the retransmission is necessary, the probability that the receiving end has succeeded in decoding of the retransmitted data. Further, because the transmitting end can diversely select the retransmitted beam combinations, it is also possible to maximize the diversity gain, and thus the diversity gain can be maximized even in a situation in which radio resources are limited.

Figure 22:
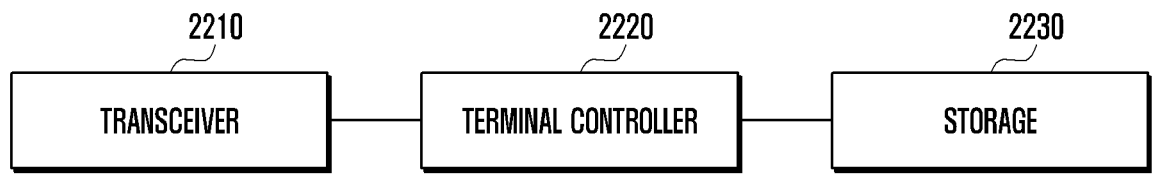
FIG. 22 is a block diagram illustrating the configuration of a terminal according to an embodiment of the disclosure.

FIG. 22 is a block diagram illustrating the configuration of a terminal according to an embodiment of the disclosure.

With reference to FIG. 22, a terminal may include a transceiver 2210, a terminal controller 2220, and a storage 2230. In the disclosure, the terminal controller 2220 may be defined as a circuit or application-specific integrated circuit or at least one processor.

The transceiver 2210 may transmit and receive a signal to and from another network entity. For example, the transceiver 2210 may receive initially transmitted data to which beam diversity is applied from a base station through a plurality of beams, and it may transmit a signal for requesting retransmission to the base station, and then may receive retransmitted data from the base station.

The terminal controller 2220 may control the overall operation of the terminal according an embodiment proposed in the disclosure. For example, the terminal controller 2220 may control a signal flow between respective blocks to perform an operation according to the above-described drawings and flowcharts. Specifically, the terminal controller 2220 may operate in accordance with a control signal from the base station, select a beam candidate group in accordance with the beam measurement result with the base station, notify the base station of this, and receive and decode the initially transmitted data or retransmitted data to which the beam diversity is applied from the base station.

The storage 2230 may store at least one of information transmitted and received through the transceiver 2210 and information generated through the terminal controller 2220.

Figure 23:
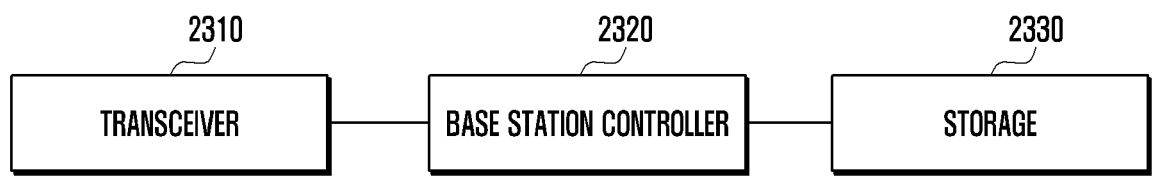
FIG. 23 is a block diagram illustrating the configuration of a base station according to an embodiment of the disclosure.

FIG. 23 is a block diagram illustrating the configuration of a base station according to an embodiment of the disclosure.

With reference to FIG. 23, a base station may include a transceiver 2310, a base station controller 2320, and a storage 2330. In the disclosure, the base station controller 2320 may be defined as a circuit or application-specific integrated circuit or at least one processor.

The transceiver 2310 may transmit and receive a signal to and from another network entity. For example, the transceiver 2310 may receive the beam measurement result from a terminal, and it may transmit initially transmitted data or retransmitted data to the terminal based on the beam measurement result.

The base station controller 2320 may control the overall operation of the base station according an embodiment proposed in the disclosure. For example, the base station controller 2320 may control a signal flow between respective blocks to perform an operation according to the above-described drawings and flowcharts. Specifically, if the beam measurement result is received from the terminal, the base station controller 2320 may select a beam to which the beam diversity is to be applied through the corresponding beam candidate group, and it may apply the beam diversity to the initially transmitted data or retransmitted data using the corresponding beam.

The storage 2330 may store at least one of information transmitted and received through the transceiver 2310 and information generated through the base station controller 2320.

As described above, embodiments disclosed in the specification and drawings are merely used to present specific examples to easily explain the contents of the disclosure and to help understanding, but are not intended to limit the scope of the disclosure. Accordingly, the scope of the disclosure should be interpreted to include all changes or modifications derived based on the technical concept of the disclosure in addition to the embodiments disclosed herein.

The invention claimed is:

1. A method performed by a terminal in a wireless communication system, the method comprising:
  receiving, from a base station, a data;
  transmitting, to the base station, a message indicating a hybrid automatic repeat request (HARQ) negative acknowledgement (NACK) for the data, wherein the message includes an indicator for requesting a HARQ retransmission of the data on a plurality of transmission beams of the base station, the plurality of the transmission beams including a first transmission beam and a second transmission beam;
  receiving, from the base station, a first HARQ data on a first reception beam and a second HARQ data on a second reception beam simultaneously based on the indicator; and
  processing the first HARQ data and the second HARQ data together, wherein the first HARQ data and the second HARQ data are HARQ retransmission data for the data, and wherein the first HARQ data is at least partly equal to the second HARQ data.

2. The method of claim 1, wherein the first reception beam is paired with the first transmission beam and the second reception beam is paired with the second transmission beam.

3. The method of claim 2, the method further comprising:

identifying the first reception beam and the second reception beam from a beam candidate group of which a beam gain is measured to be equal to or higher than a threshold value, wherein the beam gain is measured based on a combination of a reception beam from a plurality of reception beams of the terminal and a transmission beam from the plurality of the transmission beams.

4. The method of claim 1, the method further comprising:

configuring communication with the base station utilizing a cross-polarization antenna of the terminal, wherein the first HARQ data and the second HARQ data are received by the cross-polarization antenna.

5. A terminal in a wireless communication system, the terminal comprising:

a transceiver configured to transmit and receive a signal; and a controller configured to:

receive, from a base station, a data, transmit, to the base station, a message indicating a hybrid automatic repeat request (HARQ) negative acknowledgement (NACK) for the data, wherein the message includes an indicator for requesting a HARQ retransmission of the data on a plurality of transmission beams of the base station, the plurality of the transmission beams including a first transmission beam and a second transmission beam, receive, from the base station, a first HARQ data on a first reception beam and a second HARQ data on a second reception beam simultaneously based on the indicator, and process the first HARQ data and the second HARQ data together, wherein the first HARQ data and the second HARQ data are HARQ retransmission data for the data, and wherein the first HARQ data is at least partly equal to the second HARQ data.

6. The terminal of claim 5, wherein the first reception beam is paired with the first transmission beam and the second reception beam is paired with the second transmission beam.

7. The terminal of claim 6, wherein the controller is further configured to identify the first reception beam and the second reception beam from a beam candidate group of which a beam gain is measured to be equal to or higher than a threshold value, and wherein the beam gain is measured based on a combination of a reception beam from a plurality of reception beams of the terminal and a transmission beam from the plurality of the transmission beams.

8. The terminal of claim 5, wherein the controller is further configured to communicate with the base station utilizing a cross-polarization antenna of the terminal, and wherein the first HARQ data and the second HARQ data are received by the cross-polarization antenna.

9. A method performed by a base station in a wireless communication system, the method comprising:

transmitting, to a terminal, a data;

receiving, from the terminal, a message indicating a hybrid automatic repeat request (HARQ) negative acknowledgement (NACK) for the data, wherein the message includes an indicator for requesting a HARQ retransmission of the data on a plurality of transmission beams including a first transmission beam and a second transmission beam;

selecting a-the first transmission beam for a first HARQ data and a-the second transmission beam for a second HARQ data based on the indicator; and transmitting, to the terminal, the first HARQ data on the first transmission beam and the second HARQ data on the second transmission beam simultaneously based on the indicator, wherein the first HARQ data and the second HARQ data are HARQ retransmission data for the data, and wherein the first HARQ data is at least partly equal to the second HARQ data.

10. The method of claim 9, wherein the first transmission beam is paired with a first reception beam of the terminal and the second transmission beam is paired with a second reception beam of the terminal.

11. The method of claim 10, the method further comprising:

identifying the first transmission beam and the second transmission beam from a beam candidate group of which a beam gain is measured to be equal to or higher than a threshold value, wherein the beam gain is measured based on a combination of a reception beam from a plurality of reception beams of the terminal and a transmission beam from the plurality of the transmission beams.

12. The method of claim 9, the method further comprising:

configuring communication with the terminal utilizing a cross-polarization antenna of the base station, wherein the first HARQ data and the second HARQ data are transmitted by the cross-polarization antenna.

13. A base station in a wireless communication system, the base station comprising:

a transceiver configured to transmit and receive a signal; and a controller configured to:

transmit, to a terminal, a data, receive, from the terminal, a message indicating a hybrid automatic repeat request (HARQ) negative acknowledgement (NACK) for the data, wherein the message includes an indicator for requesting a HARQ retransmission of the data on a plurality of transmission beams including a first transmission beam and a second transmission beam, select the first transmission beam for a first HARQ data and the second transmission beam for a second HARQ data based on the indicator, and transmit, to the terminal, the first HARQ data on the first transmission beam and the second HARQ data on the second transmission beam simultaneously based on the indicator, wherein the first HARQ data and the second HARQ data are HARQ retransmission data for the data, and wherein the first HARQ data is at least partly equal to the second HARQ data.

14. The base station of claim 13,
wherein the first transmission beam is paired with a first reception beam of the terminal and the second transmission beam is paired with a second reception beam of the terminal.

15. The base station of claim 14,
wherein the controller is further configured to identify the first transmission beam and the second transmission beam from a beam candidate group of which a beam gain is measured to be equal to or higher than a threshold value, and
wherein the beam gain is measured based on a combination of a reception beam from a plurality of reception beams of the terminal and a transmission beam from the plurality of the transmission beams.

16. The base station of claim 13,
wherein the controller is configured to communicate with the terminal utilizing a cross-polarization antenna of the base station, and
wherein the first HARQ data and the second HARQ data are transmitted by the cross-polarization antenna.

\* \* \* \* \*